(12) United States Patent
Zhao et al.

(10) Patent No.: US 11,873,447 B1
(45) Date of Patent: Jan. 16, 2024

(54) SUPERHYDROPHOBIC NANOPARTICALS AND PREPARATION METHOD THEREFOR, AND SUPERHYDROPHOBIC NANOFLUID

(71) Applicant: China University of Petroleum (East China), Qingdao (CN)

(72) Inventors: Mingwei Zhao, Qingdao (CN); Caili Dai, Qingdao (CN); Zhongzheng Xu, Qingdao (CN); Yining Wu, Qingdao (CN); Mingwei Gao, Qingdao (CN); Lin Li, Qingdao (CN); Guang Zhao, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/353,656

(22) Filed: Jul. 17, 2023

(51) Int. Cl.
  *C09K 8/584* (2006.01)
  *C09K 8/592* (2006.01)
  *B82Y 30/00* (2011.01)
  *B82Y 40/00* (2011.01)

(52) U.S. Cl.
  CPC .............. *C09K 8/584* (2013.01); *C09K 8/592* (2013.01); *B82Y 30/00* (2013.01); *B82Y 40/00* (2013.01); *C09K 2208/10* (2013.01); *C09K 2208/28* (2013.01)

(58) Field of Classification Search
  None
  See application file for complete search history.

(56) References Cited

U.S. PATENT DOCUMENTS

| 9,206,683 B2 * | 12/2015 | Blair | E21B 43/26 |
| 2021/0054263 A1 * | 2/2021 | Saini | E21B 43/267 |

FOREIGN PATENT DOCUMENTS

| CA | 2821377 A1 * | 4/2012 | ............... C09K 8/62 |
| CN | 106479469 B | 3/2017 | |
| CN | 110194949 A | 9/2019 | |
| CN | 111088008 B | 5/2020 | |
| CN | 114644914 A | 6/2022 | |

* cited by examiner

Primary Examiner — John J Figueroa
(74) *Attorney, Agent, or Firm* — Calfee, Halter & Griswold LLP

(57) ABSTRACT

The present disclosure discloses superhydrophobic nanoparticles and a preparation method therefor, and a superhydrophobic nanofluid.

13 Claims, 20 Drawing Sheets

SUPERHYDROPHOBIC NANOPARTICALS AND PREPARATION METHOD THEREFOR, AND SUPERHYDROPHOBIC NANOFLUID

CROSS-REFERENCE TO RELATED APPLICATIONS

This application claims priority to Chinese Application No. 202310287826. X, filed on Mar. 23, 2023.

FIELD

The present disclosure relates to functional nanomaterials and oil and gas development technology, in particular to superhydrophobic nanoparticles and a preparation method therefor, and a superhydrophobic nanofluid.

BACKGROUND

With the continuous increase of oilfield exploration and development, the existing oil and gas resources decrease year by year, the exploitation difficulty increases, and thus unconventional oil and gas resources become more and more important. Due to insufficient natural energy, it is often necessary to replenish formation energy by waterflooding in the later stage of oilfield development, however, unconventional reservoirs have the characteristic of low porosity and low permeability, resulting in high waterflooding pressure and even inability to inject water into the formation. Drag reduction by surface modification of reservoir rocks is considered to be an effective way to solve the problem of too high waterflooding pressure in low-permeability reservoirs.

Currently, this technology mainly includes surfactant modification and nanomaterial modification. Related technologies of the surfactant modification are reported as follows: CN111088008B reported a surfactant composition for decompression and augmented injection of low-permeability reservoirs, mainly by means of a combination of a non-ionic surfactant and a cationic surfactant. In CN114644914A, lactone-type sophorolipid is sulfonated by a sulfonating agent to prepare a material which is applied to low-permeability oilfields as a decompression and augmented injection agent. Related technologies of the nanomaterial modification are reported as follows: in CN106479469B, nanosilica particles are modified with alkyl and alkyl acid double groups, and the modified nanosilica particles are mixed with a NaOH aqueous solution to prepare an augmented injection agent for oilfield waterflooding. CN110194949A reported a decompression and augmented injection chemical agent, wherein a hydrophobic group provided by (3-alkoxysilyl)alkyl methacrylate and a phosphate group provided by mercaptoalkylcarbonylethyl phosphate are used as modifying groups covalently connected to silica particles in double grafted nanosilica. However, both methods have certain shortcomings, in short, the effective life of surfactants is short, and the surfactant is sensitive to the environment, and nanomaterials are easily aggregated under formation conditions of high temperature and high salinity, resulting in poor stability. Therefore, there is an urgent need for a new method for super drag reduction in waterflooding development of low-permeability reservoirs to realize high-efficiency decompression and augmented injection.

In recent years, the research and methods of bionics are increasingly applied to various fields, and new solutions are provided for effectively solving technical and scientific problems by taking advantage of the structure, principle, function and the like of a biological system. In terms of reducing reservoir injection resistance, based on the inspiration of a "lotus-leaf effect", a superhydrophobic interface may be used to anchor a nano-gas film to achieve bionic drag reduction. Some studies have shown that the surfaces of lotus leaves have a superhydrophobic micro/nano structure, and relevant researchers have proposed that when the superhydrophobic surface is in contact with water, the surface can adsorb a fixed nano-gas layer, thereby forming a multiphase interface. The presence of a gaseous film can reduce the huge resistance caused by liquid-solid direct contact. The research and application of this technology in the petroleum field has also been developed gradually in recent years, and currently, the accepted mechanism is that hydrophobic nanoparticles can form a stable hydrophobic surface film, while the principle of formation of hydrophobic films and the mechanism of drag reduction lack strong experimental evidence, and at the same time the dispersion stability of hydrophobic nanomaterials is still an urgent problem to be solved. Therefore, there is an urgent need to find a new drag reduction method with a long effective period, good stability, and a wide range of application scenarios in terms of bionic drag reduction, so as to efficiently achieve decompression and augmented injection.

Through the above analysis, the problems and defects of the existing art are as follows:
(1) the existing surfactant decompression and augmented injection agents have poor compatibility with the reservoir environment, and a short effective life;
(2) the existing hydrophobic materials for oilfields have a limited degree of hydrophobicity and poor dispersion stability;
(3) when hydrophobic materials in the existing art are applied to drag reduction in a reservoir core, wrinkles and trenches in a fluid flow channel in the core cannot be filled effectively, and the roughness of the core surface is high, so that liquid-solid direct contact generates greater resistance.

SUMMARY

An object of the present disclosure is to overcome the defects of poor hydrophobicity and dispersion stability of the existing hydrophobic materials for oilfields, and poor effects when the hydrophobic materials are applied to drag reduction in a reservoir core in the existing art, and provide superhydrophobic nanoparticles and a preparation method therefor, and a superhydrophobic nanofluid, wherein the superhydrophobic nanoparticles have a contact angle of water drops in air that can be as high as $165°±2.4°$; and the prepared superhydrophobic nanofluid has excellent effects in decompression and augmented injection of low-permeability reservoirs, and has a drag reduction ratio reaching 1.35 times or more that of existing nanomaterials.

In order to achieve the above object, the first aspect of the present disclosure provides a superhydrophobic nanoparticles including $SiO_2$ and a fluorine-containing long chain grafted on the surface of $SiO_2$, wherein the fluorine-containing long chain is a structural unit provided by heptadecafluorodecyltrimethoxysilane.

In a second aspect, the present disclosure provides a method for preparing a superhydrophobic nanoparticles comprising:
S101, removing moisture adsorbed by nano $SiO_2$ under the vacuum condition to obtain a product I;
S102, subjecting the product I, heptadecafluorodecyltrimethoxysilane, and acetic acid to oil bath heating in an acetone solution under the condition of nitrogen protection, and performing rotary evaporation concentration treatment to obtain a product II;

S103, dissolving the product II in a xylene solution, and performing purification treatment, performing centrifugal separation on the purified product II, and performing vacuum drying and grinding treatment to obtain the superhydrophobic nanoparticles.

In a third aspect, the present disclosure provides a superhydrophobic functional nanofluid including one or more of superhydrophobic nanoparticles, water, ethanol, sodium alpha-olefin sulfonate and lauramidopropyl betaine, and a mass ratio of the superhydrophobic nanoparticles to the water to ethanol to sodium alpha-olefin sulfonate to lauramidopropyl betaine is (0.01-0.15):100:(0.5-1):(1-2):(1-2); wherein the superhydrophobic nanoparticles are the aforementioned superhydrophobic nanoparticles.

In a fourth aspect, the present disclosure provides a method for preparing a superhydrophobic functional nanofluid comprising:

S201, mixing superhydrophobic nanoparticles with an ethanol solution, and adding water to obtain a solution I; wherein the superhydrophobic nanoparticles are the aforementioned superhydrophobic nanoparticles;

S202, dissolving sodium alpha-olefin sulfonate and lauramidopropyl betaine in water, performing mixing, and adding the obtained mixed solution into the solution I to obtain a solution II;

S203, subjecting the solution II to ultrasonic dispersion treatment under the heating condition to obtain the superhydrophobic functional nanofluid.

In a fifth aspect, the present disclosure provides a method for superhydrophobic interfacial gas film drag reduction suitable for waterflooding development of low-permeability reservoirs based on a lotus leaf bionic thinking comprising: forming a plurality of micro/nano rough structures on the surface of a core by self-assembling the aforementioned superhydrophobic nanoparticles, filling wrinkles and trenches in a fluid flow channel in the core to reduce the roughness of the core surface; simultaneously, capturing microbubbles in a fluid by a superhydrophobic interface constructed based on the idea of bionics, thereby embedding a nano-gas film on a solid-liquid contact surface; and converting a liquid-solid interface into a liquid-gas-solid interface by using a barrier effect of the gas film to reduce the resistance caused by direct liquid-solid contact.

In a sixth aspect, the present disclosure provides an apparatus for evaluating a drag reduction ratio of a superhydrophobic functional nanofluid including a six-way valve 3 and an ISCO pump 1, a nanofluid intermediate container 2, a pressure gauge 4 and a core holder 5 which are connected with the six-way valve 3, and a confining pressure pump 6 and a collection measuring cylinder 7 which are connected with the core holder 5; wherein the six-way valve 3 is adjusted to connect an outlet of the ISCO pump 1 with an inlet of the core holder 5; and the six-way valve 3 is adjusted to connect an outlet of the nanofluid intermediate container 2 filled with a nanofluid to the inlet of the core holder 5; and the core holder 5 communicates with the confining pressure pump 6 through a valve, and an outlet of the core holder 5 communicates with the collection measuring cylinder 7.

In a seventh aspect, the present disclosure provides an apparatus for evaluating the change of a flow field within a microchannel before and after adsorption of superhydrophobic nanoparticles including a display screen 8, a flow controller 9, a microparticle image velocimeter (μ-PIV) 10, a microchannel 11 and a microsyringe pump 12; wherein the microsyringe pump 12 injects liquid into the microchannel 11, flow field distribution within the microchannel before and after injection of a nanofluid is visualized by the microparticle image velocimeter (μ-PIV) 10, a field of view of flow field observation is adjusted by the flow controller 9, and finally all the visual data is transmitted to the display screen 8.

In an eighth aspect, the present disclosure provides a method of using a superhydrophobic functional nanofluid for decompression and augmented injection in waterflooding development of low-permeability oilfields, wherein the superhydrophobic functional nanofluid is the aforementioned superhydrophobic functional nanofluid.

Through the above technical solutions, the advantages and positive effects of the present disclosure are as follows:

firstly, aiming at the technical problems in the existing art and the difficulty of solving the problems, in close combination with the claimed technical solutions of the present disclosure and the results and data in the research and development process, how the technical solutions of the present disclosure solve the technical problems is analyzed in detail and profoundly, and some inventive technical effects which are brought after solving the problems are specifically described as follows:

the superhydrophobic nanoparticles (SHNPs) of the present disclosure have a contact angle of water drops in air that can be as high as 165°±2.4°; the prepared superhydrophobic nanofluid has excellent effects in decompression and augmented injection of low-permeability reservoirs, has a drag reduction ratio reaching 1.35 times or more that of conventional nanomaterials (NPs), and the highest drag reduction ratio reaches 25.7%; and compared with injection of pure water, after injection of a SHNP nanofluid, a central flow rate is increased by 98.27% during the subsequent water flooding process (a flow rate is decreased by 53.45% after injection of NPs).

Secondly, considering the technical solutions as a whole or from the perspective of a product, the technical effects and advantages of the claimed technical solutions of the present disclosure are specifically described as follows:

(1) according to the synthesized superhydrophobic nanoparticles (SHNPs) of the present disclosure, superhydrophobic nanoparticles (SHNPs) containing a fluorine-containing long chain and having low surface energy are synthesized by a coupling reaction by using nano $SiO_2$, heptadecafluorodecyltrimethoxysilane and acetic acid as reaction raw materials, and the superhydrophobic nanoparticles have a contact angle of water drops in air reaching 165°±2.4°.

(2) The superhydrophobic nanofluid prepared in the present disclosure is prepared by compounding superhydrophobic nanoparticles (SHNPs) with a composite surfactant (sodium alpha-olefin sulfonate AOS and lauramidopropyl betaine LAB) to form a superhydrophobic nanofluid which is stable in a long term with a particle size stabilized to be 28 nm within 1 month and a zeta potential maintained to be −30 mV or more.

(3) The superhydrophobic nanofluid prepared in the present disclosure has excellent effects in core drag reduction and reducing flow resistance. Under the same conditions, the drag reduction ratio reaches 1.35 times or more that of existing nanomaterials (NPs), and the highest drag reduction ratio reaches 25.7%; and compared with injection of pure water, after injection of the SHNP nanofluid, a central flow rate is increased by 98.27% during the subsequent water flooding process (a flow rate is decreased by 53.45% after injection of NPs).

(4) The method for preparing the superhydrophobic nanofluid of the present disclosure is simple, and raw materials are inexpensive, and the superhydrophobic nanofluid is applicable to nano $SiO_2$ particles of various practical application sizes, and has great application potential in core matrix drag reduction, reduction of the waterflooding pressure, increase of the waterflooding amount and so on.

(5) When the superhydrophobic nanofluid prepared in the present disclosure is applied to drag reduction of a reservoir core, the superhydrophobic nanoparticles carried can form a large number of micro/nano rough structures on the core surface by self-assembly, and the wrinkles and trenches in the fluid flow channel in the core are filled, effectively reducing the roughness of the core surface. At the same time, the superhydrophobic interface constructed based on the idea of bionics can successfully capture microbubbles in the fluid, thereby embedding a nano-gas film on the solid-liquid contact surface. The liquid-solid interface is converted into the liquid-gas-solid interface by using the barrier effect of the gas film, greatly reducing the greater resistance caused by direct liquid-solid contact.

Thirdly, as the inventiveness of the present disclosure, it is also embodied in the following important aspects:

(1) In recent years, nanomaterials have been applied more and more widely in the field of development of oil and gas fields, especially for oil and gas fields with low porosity and low permeability. Currently, oil fields in China will adopt waterflooding development of different process means, and nanomaterials have completed large-scale production applications in terms of oil flooding agents, imbibing agents, enhancing agents and the like due to their small size effects. The method for preparing the superhydrophobic nanofluid provided by the technical solution of the present disclosure is simple, the superhydrophobic nanofluid has remarkable effects, and can be licensed through the patented technology, pilot and final production are completed, and a technical reserve is provided for long-term supply of oilfield development.

(2) Explanation of the principle of the technical solution of the present disclosure reveals the drag reduction mechanism of superhydrophobic materials, and the superhydrophobic interface can successfully capture the microbubbles in the fluid, thereby embedding the nano-gas film on the solid-liquid contact surface. The liquid-solid interface is converted into the liquid-gas-solid interface by using the barrier effect of the gas film, greatly reducing the greater resistance caused by direct liquid-solid contact, and based on the bubble probe technology of atomic force microscopy, the mechanical evidence of nano-gas film formation is given. A perfect and accurate theoretical basis for the drag reduction technology of superhydrophobic nanomaterials is successfully provided.

BRIEF DESCRIPTION OF THE DRAWINGS

The drawings herein are incorporated into and constitute part of the description, illustrating the examples conforming to the present disclosure, and are used together with the description to interpret the principles of the present disclosure.

DESCRIPTION OF REFERENCE SIGNS

Figure 13:
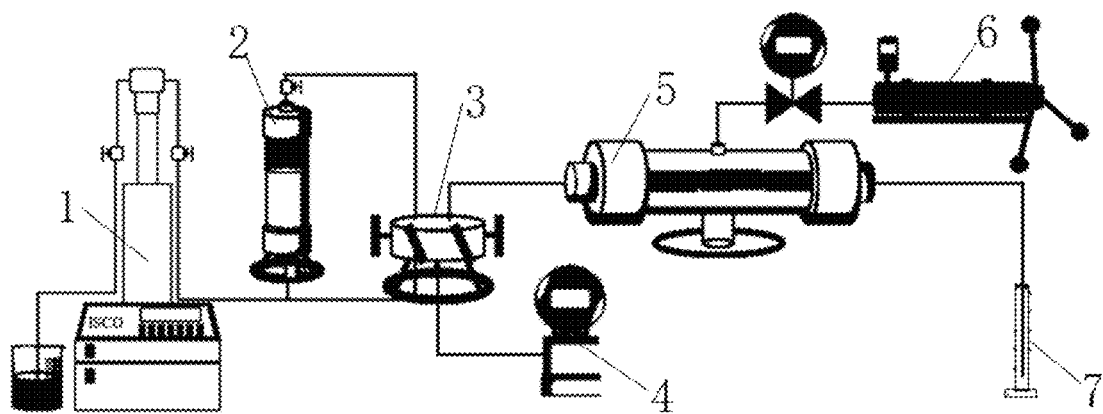
FIG. 13 is a schematic diagram of a core flow experimental device of the present disclosure.
Figure 14:
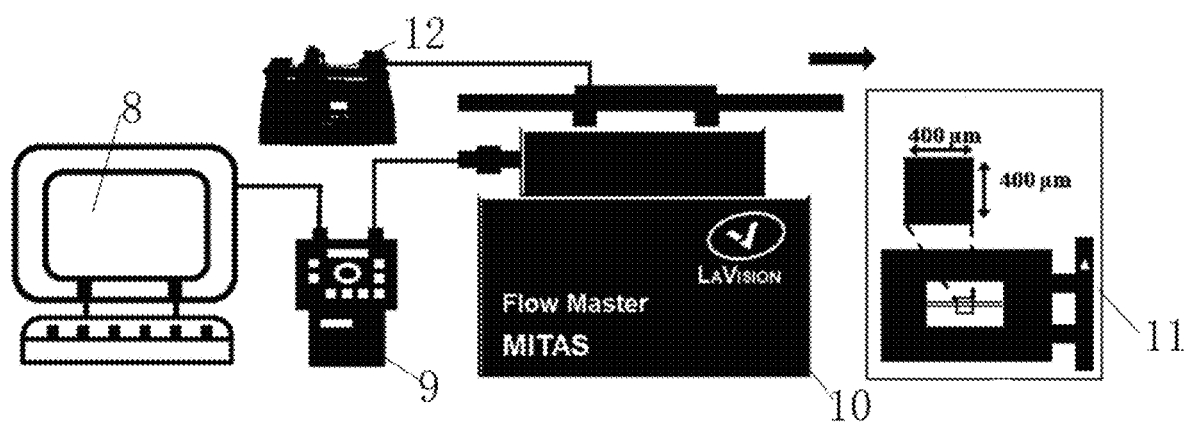
FIG. 14 is a schematic diagram of a microchannel visual flow field experimental device of the present disclosure.

In FIGS. 13 and 14:
1—ISCO pump, 2—nanofluid intermediate container, 3—six—way valve, 4—pressure gauge, holder, 6—confining pressure pump, 7—collection measuring cylinder, 8—display screen, 9—flow controller, 10—microparticle image velocimetry (μ-PIV), 11—microchannel, 12—microsyringe pump.

DETAILED DESCRIPTION

In order to make the above objects, features and advantages of the present disclosure more apparent and understandable, the specific embodiments of the present disclosure are described below in detail in combination with the accompanying drawings. Numerous specific details are set forth in the following description in order to provide a thorough understanding of the present disclosure. However, the present disclosure can be implemented in many ways other than those described herein, those skilled in the art may make similar modifications without violating the connotation of the present disclosure, and therefore the present disclosure is not limited by the specific embodiments disclosed below.

In a first aspect, the present disclosure provides a superhydrophobic nanoparticles including $SiO_2$ and a fluorine-containing long chain grafted on the surface of $SiO_2$, wherein the fluorine-containing long chain is a structural unit provided by heptadecafluorodecyltrimethoxysilane.

According to the present disclosure, the superhydrophobic nanoparticles have a contact angle in air of 165°±2.4°.

In the present disclosure, according to the superhydrophobic nanoparticles, heptadecafluorodecyltrimethoxysilane is hydrolyzed in a solution to form silanol, which has a large number of highly reactive hydroxy and can react with hydroxy on the surface of purified nano $SiO_2$ to graft the fluorine-containing long chain to the surface of nano $SiO_2$ Preparation of superhydrophobic surfaces mainly relies on the construction of micro/nano rough structures and the grafting of low surface energy functional groups on the surface.

In the present disclosure, the superhydrophobic nanoparticles are superhydrophobic nanoparticles (SHNPs) containing a long fluorine chain and having low surface energy, and the superhydrophobic nanoparticles include $FAS@SiO_2$. Wherein FAS is heptadecafluorodecyltrimethoxysilane.

Figure 1:
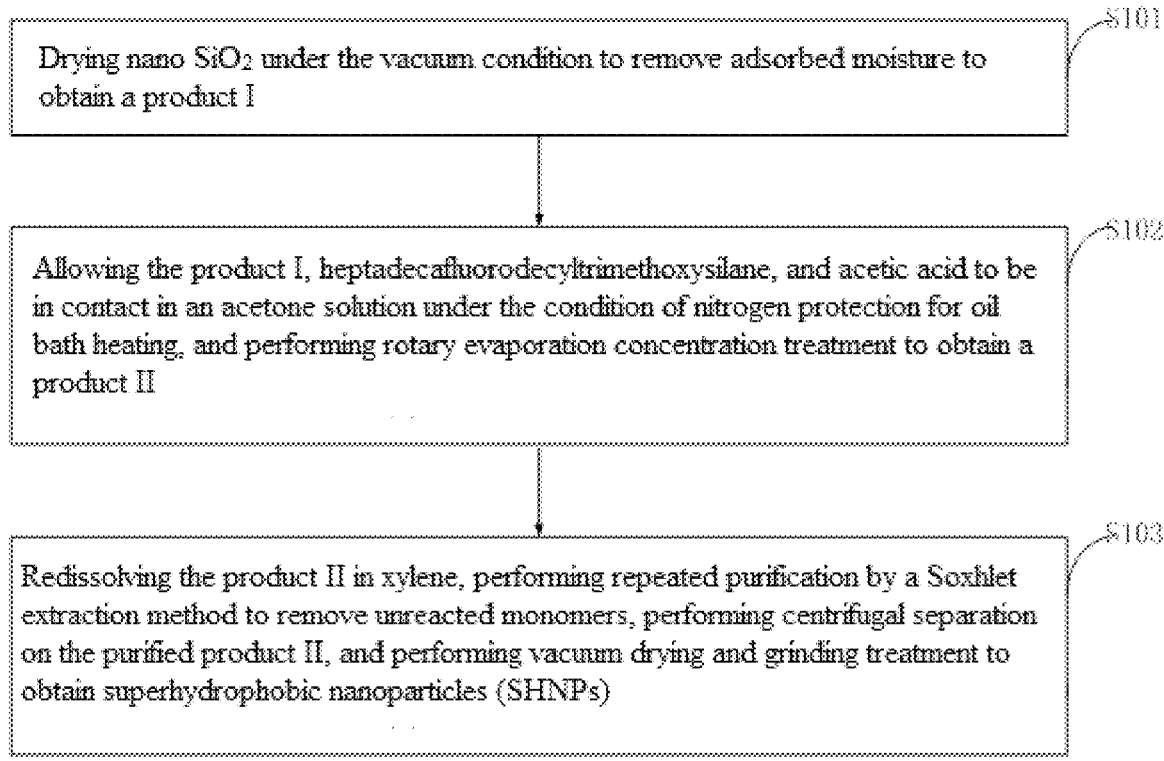
FIG. 1 is a flowchart of a method for preparing superhydrophobic nanoparticles (SHNPs) provided by the present disclosure.

As shown in FIG. 1, according to a second aspect of the present disclosure provides a method for preparing superhydrophobic nanoparticles comprising:

S101, removing moisture adsorbed by nano $SiO_2$ under the vacuum condition to obtain a product I;

S102, subjecting the product I, heptadecafluorodecyltrimethoxysilane, and acetic acid to oil bath heating in an acetone solution under the condition of nitrogen protection, and performing rotary evaporation concentration treatment to obtain a product II;

S103, dissolving the product II in a xylene solution, and performing purification treatment, performing centrifugal separation on the purified product II, and performing vacuum drying and grinding treatment to obtain the superhydrophobic nanoparticles.

According to the present disclosure, in the step S101, the nano $SiO_2$ has an original particle size in a range from 10 to 20 nm, preferably is 20 nm, and the drying employs vacuum drying, and the vacuum drying temperature is in range from 100 to 120° C., preferably is 120° C. [0090] The vacuum is typically −0.1 MPa.

According to the present disclosure, in the step S102, the product I, heptadecafluorodecyltrimethoxysilane, and acetic acid are subjected to oil bath heating in the acetone solution, and rotary evaporation concentration treatment is performed to obtain the product II; wherein a mass ratio of the usage amount of the product I to the usage amount of heptadecafluorodecyltrimethoxysilane is (140-80):(8-1) relative to a range from 20 to 50 mL of the acetone solution, and a pH of the solution is adjusted to be in a range from 3 to 5 by acetic acid; and preferably, a mass ratio of the product I to heptadecafluorodecyltrimethoxysilane is (120-100):(4-2) relative to 20 mL of the acetone solution, and a pH is adjusted to be in a range from 3 to 4 by using an acetic acid solution.

According to the present disclosure, in the step S102, the oil bath heating is performed at a temperature in a range from 45 to 70° C., preferably from 50 to 60° C. for heating time in a range from 2 to 4 h; and the rotary evaporation concentration is performed at a temperature in a range from 50 to 80° C., preferably from 60 to 70° C.

According to the present disclosure, in the step S103, the purification is repeatedly performed by a Soxhlet extraction method until it is observed that a xylene solution is clarified during condensation reflux; the centrifugal separation is performed at a rotational speed in a range from 5000 to 10000 rpm, preferably from 6000 to 8000 rpm for centrifugation time in a range from 5 to 8 min; and the vacuum drying is performed at a temperature in a range from 100 to 120° C., preferably is 120° C.

According to one preferred specific embodiment of the present disclosure, a method for preparing the superhydrophobic nanoparticles (SHNPs) comprising:

(S1-1) drying 100 g of nano $SiO_2$ (having a diameter of 20 nm) under the vacuum condition to remove adsorbed moisture to obtain a product I;

(S1-2) allowing the product I, heptadecafluorodecyltrimethoxysilane, and acetic acid to be in contact in an acetone solution under the condition of nitrogen protection for oil bath heating, and performing rotary evaporation concentration treatment to obtain a product II; wherein a mass ratio of the product I to heptadecafluorodecyltrimethoxysilane is (120-100):(4-2) relative to 20 mL of the acetone solution, and a pH is adjusted to be in a range from 3 to 4 by using an acetic acid solution; and (S1-3) redissolving 50 g of the product II in 500 mL of xylene, performing repeated purification by a Soxhlet extraction method until a xylene solution is clarified during condensation reflux to remove unreacted monomers, performing centrifugal separation on the purified product II at in a range from 6000 to 8000 rpm for centrifugation time in a range from 5 to 8 min, performing vacuum drying at 120° C., and performing grinding treatment to obtain the superhydrophobic nanoparticles (SHNPs).

The present disclosure also provides hydrophobic nanoparticles prepared by the method for preparing the hydrophobic nanoparticles.

In a third aspect, the present disclosure provides a superhydrophobic functional nanofluid, wherein the superhydrophobic functional nanofluid includes one or more of superhydrophobic nanoparticles, water, ethanol, sodium alpha-olefin sulfonate and lauramidopropyl betaine, and a mass ratio of the superhydrophobic nanoparticles to the water to ethanol to sodium alpha-olefin sulfonate to lauramidopropyl betaine is (0.01-0.15):100:(0.5-1):(1-2):(1-2); wherein the superhydrophobic nanoparticles are the aforementioned superhydrophobic nanoparticles.

An action mechanism of the superhydrophobic nanofluid is as follows:

through a certain closing-in time, SHNPs are adsorbed on the core surface, and a large number of hydrophobic rough structures are formed. On one hand, micro/nano rough structures can effectively reduce the roughness of the core surface, and suppress wall turbulence; on the other hand, a superhydrophobic interface is successfully constructed on the core surface through adsorption of SHNPs, and a gaseous film is formed, a liquid-solid interface is converted into a liquid-gas-solid interface through a barrier effect of a gas film, and the large resistance generated by liquid-solid direct contact is reduced, thereby improving the waterflooding effect. The superhydrophobic nanofluid can be applied in waterflooding development of low-permeability oilfields.

Figure 2:
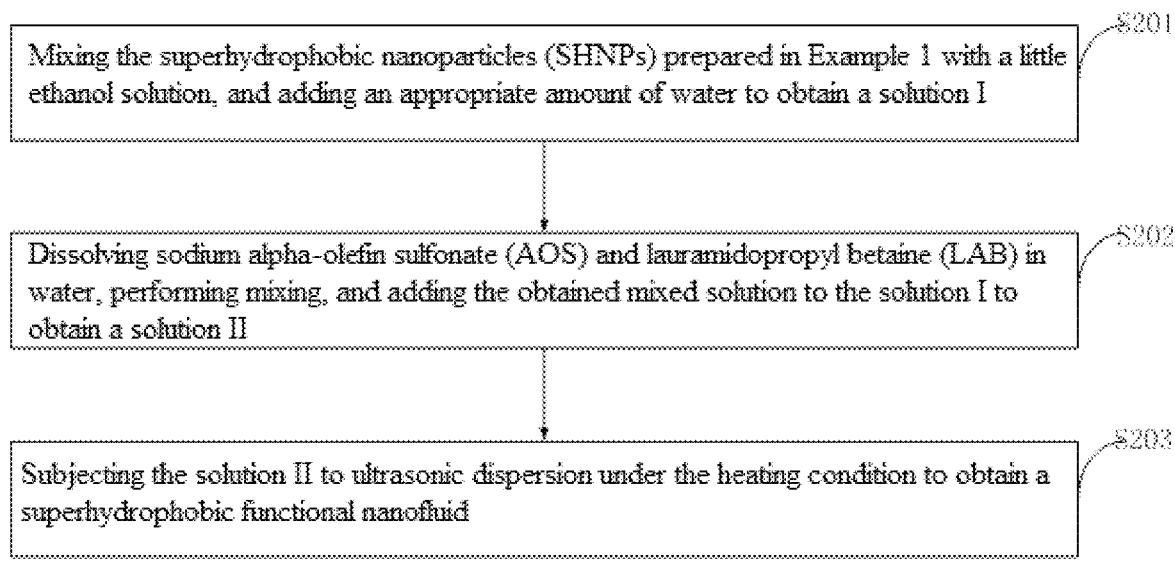
FIG. 2 is a flowchart of a method for preparing a superhydrophobic functional nanofluid provided by the present disclosure.

In the present disclosure, in order to successfully inject superhydrophobic nanoparticles (SHNPs) into the formation, it is necessary to disperse the SHNPs into an aqueous solution by using surfactants. Hydrophobic tails of surfactant molecules can be adsorbed on the surfaces of nanoparticles, hydrophilic groups are exposed, and the interfacial energy of the system is reduced, thereby dispersing the intrinsically hydrophobic nanoparticles into an aqueous phase. As shown in FIG. 2, in a fourth aspect, the present disclosure provides a method for preparing a superhydrophobic functional nanofluid comprising:

S201, mixing superhydrophobic nanoparticles with an ethanol solution, and adding water to obtain a solution I; wherein the superhydrophobic nanoparticles are the aforementioned superhydrophobic nanoparticles;

S202, dissolving sodium alpha-olefin sulfonate and lauramidopropyl betaine in water, performing mixing, and adding the obtained mixed solution into the solution I to obtain a solution II;

S203, subjecting the solution II to ultrasonic dispersion treatment under the heating condition to obtain the superhydrophobic functional nanofluid.

According to the above method, it can be understood that the mixing in the step S201 is mixing the nanoparticles into water with the aid of ethanol; and the mixing in the step S202 is first dissolving sodium alpha-olefin sulfonate and lauramidopropyl betaine in water to obtain a surfactant solution. Finally, the nanoparticle solution and the surfactant solution are mixed to obtain the functional nanofluid.

According to the present disclosure, in the step S201, a mass ratio of the usage amount of the superhydrophobic nanoparticles to the usage amount of the water to the usage amount of ethanol is (0.01-0.15):100:(0.5-1). The ethanol solution, as a dispersing aid, is added in an amount so that the superhydrophobic nanoparticles are immersed without special limitation.

According to the present disclosure, in the step S202, a mass ratio of the usage amount of sodium alpha-olefin sulfonate to the usage amount of lauramidopropyl betaine is (1-2):(1-2), preferably 1:1; sodium alpha-olefin sulfonate and lauramidopropyl betaine form a composite surfactant, and the mass concentration of the composite surfactant in the resulting aqueous solution is in a range from 0.1 to 0.5%, preferably from 0.1 to 0.2%.

In the present disclosure, in the step S202, the composite surfactant disperses the superhydrophobic nanoparticles into the aqueous solution, a hydrophobic tail of the composite surfactant molecule is adsorbed on the surfaces of the superhydrophobic nanoparticles, a hydrophilic group is exposed, the interfacial energy of the system is reduced, and the superhydrophobic nanoparticles are uniformly dispersed into the aqueous phase.

According to the present disclosure, in the step S203, the ultrasonic dispersion is performed at a power in a range from 500 to 800 W, preferably 500 W for ultrasonic time in a range from 12 to 24 h, preferably 12 h; and the temperature of the heating condition is in a range from 50 to 80° C., preferably from 50 to 60° C.

According to one preferred specific embodiment of the present disclosure, the method for preparing the superhydrophobic nanofluid comprising:
- (S2-1) adding an ethanol solution as a dispersing aid in an amount so that superhydrophobic nanoparticles are immersed to obtain a solution I, wherein a mass ratio of the superhydrophobic nanoparticles (SHNPs) in the mixed solution to water is (0.05-0.10):100;
- (S2-2) dissolving a composite surfactant having a mass concentration of 0.1-0.2% (wherein a mass ratio of sodium alpha-olefin sulfonate (AOS) to lauramidopropyl betaine (LAB) is 1:1) in water for a second contact, and adding the obtained mixed solution into the solution I to obtain a solution II;
- (S2-3) subjecting the solution II to ultrasonic dispersion at a power of 500 W for 12 h at ° C. to obtain the superhydrophobic functional nanofluid.

According to another preferred specific embodiment of the present disclosure, the method for preparing the superhydrophobic nanofluid comprising:
(1) drying nano $SiO_2$ under the vacuum condition to remove adsorbed moisture to obtain a product I;
(2) allowing the product I, heptadecafluorodecyltrimethoxysilane, and acetic acid to be in contact in an acetone solution under the condition of nitrogen protection for oil bath heating, and performing rotary evaporation concentration treatment to obtain a product II;
(3) redissolving the product II in xylene, performing repeated purification by a Soxhlet extraction method to remove unreacted monomers, performing centrifugal separation on the purified product II, and performing vacuum drying and grinding treatment to obtain superhydrophobic nanoparticles (SHNPs) containing a fluorine-containing long chain and having low surface energy;
(4) forming a superhydrophobic nanofluid which is stable in a long term (>48d) by compounding surfactants (sodium alpha-olefin sulfonate and lauramidopropyl betaine). The present disclosure further provides a superhydrophobic functional nanofluid prepared by the method for preparing the superhydrophobic functional nanofluid.

In a fifth aspect, the present disclosure provides a method for superhydrophobic interfacial gas film drag reduction suitable for waterflooding development of low-permeability reservoirs based on a lotus leaf bionic thinking, and in particular relates to a bionic "lotus leaf" superophobic interfacial gas film drag reduction new method suitable for waterflooding development of low-permeability reservoirs based on construction of the nanofluid by novel superhydrophobic nanoparticles containing the fluorine-containing long chain and the composite surfactant, and in particular, the gas film drag reduction method comprising: forming a plurality of micro/nano rough structures on the surface of a core by self-assembling the aforementioned superhydrophobic nanoparticles, filling wrinkles and trenches in a fluid flow channel in the core to reduce the roughness of the core surface; simultaneously, capturing microbubbles in a fluid by a superhydrophobic interface constructed based on the idea of bionics, thereby embedding a nano-gas film on a solid-liquid contact surface; and converting a liquid-solid interface into a liquid-gas-solid interface by using a barrier effect of the gas film to reduce the resistance caused by direct liquid-solid contact.

In a sixth aspect, the present disclosure provides an apparatus for evaluating a drag reduction ratio of a superhydrophobic functional nanofluid including a six-way valve 3 and an ISCO pump 1, a nanofluid intermediate container 2, a pressure gauge 4 and a core holder 5 which are connected with the six-way valve 3, and a confining pressure pump 6 and a collection measuring cylinder 7 which are connected with the core holder 5; wherein the six-way valve 3 is adjusted to connect an outlet of the ISCO pump 1 with an inlet of the core holder 5; and the six-way valve 3 is adjusted to connect an outlet of the nanofluid intermediate container 2 filled with a nanofluid to the inlet of the core holder 5; and the core holder 5 communicates with the confining pressure pump 6 through a valve, and an outlet of the core holder 5 communicates with the collection measuring cylinder 7.

In a seventh aspect, the present disclosure provides an apparatus for evaluating the change of a flow field within a microchannel before and after adsorption of superhydrophobic nanoparticles including a display screen 8, a flow controller 9, a microparticle image velocimeter (μ-PIV) 10, a microchannel 11 and a microsyringe pump 12; wherein the microsyringe pump 12 injects liquid into the microchannel 11, flow field distribution within the microchannel before and after injection of a nanofluid is visualized by the microparticle image velocimeter (μ-PIV) 10, a field of view of flow field observation is adjusted by the flow controller 9, and finally all the visual data is transmitted to the display screen 8.

In an eighth aspect, the present disclosure provides a method of using a superhydrophobic functional nanofluid for decompression and augmented injection in waterflooding development of low-permeability oilfields, wherein the superhydrophobic functional nanofluid is the aforementioned superhydrophobic functional nanofluid.

EXPLANATION

In the following examples and comparative examples:
an example of the present disclosure proposes a superhydrophobic interfacial gas film drag reduction new method suitable for waterflooding development of low-permeability reservoirs based on a "lotus leaf" bionic thinking. A main process is as follows: superhydrophobic nanoparticles (SHNPs) are prepared from nanosilica as a raw material by grafting modification with a fluorine-containing long chain coupling agent to be dispersed by surfactants to construct a stable superhydrophobic functional nanofluid. The superhydrophobic nanoparticles can form a large number of micro/nano rough structures on the core surface by self-assembly, and the wrinkles and trenches in the fluid flow channel in the core are filled, effectively reducing the roughness of the core surface. At the same time, the superhydrophobic interface constructed based on the idea of bionics can successfully capture microbubbles in the fluid, thereby embedding a nano-gas film on the solid-liquid contact surface. The liquid-solid interface is converted into the liquid-gas-solid interface by using the barrier effect of the gas film, greatly reducing the greater resistance caused by direct liquid-solid contact. The modified superhydrophobic functional nanofluid exhibits good performance in terms of reducing reservoir injection pressure and reducing flow resistance.

In the following examples and comparative examples: the functional group composition and elemental distribution on the surfaces of particles at each modification stage were determined by Fourier infrared spectroscopy (Bruker, VERTEX 8v) and x-ray photoelectron spectroscopy (Thermo scientific, Escalab 250Xi); the wettability was measured by a dynamic contact angle meter (POWEREACH, JC2000D); a dispersion process of nanoparticles and surfactants was performed by using an ultrasonic disperser (SCIENTZ, JY92-IIN); and the particle size and potential of a nanofluid were measured by a dynamic light scattering instrument (Brookhaven, BI-200SM). A core flooding experimental apparatus was self-assembled in a laboratory, and the core permeability and porosity used in the experimental process were measured by a gas phase permeability meter (Beijing Yineng Petroleum Technology, ULP-613) and a helium gas porosimeter (Beijing Yineng Petroleum Technology, PMI-100), respectively; surface topography and elemental distribution before and after core flooding were measured by field emission scanning electron microscopy (FEI QUANTA FEG250), and three-dimensional topography and roughness on the core surface were measured by a laser confocal microscope (KEYENCE, VK-X250); a visual flow field experimental device was self-assembled in a laboratory; the adsorption and assembly morphology of nanoparticles and surfactants on a wall was measured by an atomic force microscope (Bruker, MultiMode 8); and a needleless probe used in the bubble-wall force measurement was a specially customized product in a laboratory.

A raw material nano $SiO_2$ (20 nm) was purchased from BROFOS Nanotechnology Co., Ltd. SHNPs were prepared by grafting modification with a silane coupling agent including trimethoxy(1H,1H,2H,2H-heptadecafluorodecyl)silane (abbreviated as FAS), dimethyldichlorosilane (abbreviated as DMDCS) and octamethylcyclotetrasiloxane (abbreviated as D4) which were purchased from Aladdin Reagent Co., Ltd. The SHNPs were dispersed by using surfactants such as sodium alpha-olefin sulfonate (abbreviated as AOS, purchased from Shanghai Sinopharm), Triton X-100 (TX100, purchased from Shanghai Sinopharm), lauramidopropyl betaine (abbreviated as LAB, purchased from Lusen Chemicals), and lauramidopropyl hydroxy sulfobetaine (abbreviated as LHSB, purchased from Lusen Chemicals). Hydrophobically modified dodecyl mercaptan for an AFM bubble probe was purchased from Aladdin Reagent Co., Ltd. Deionized water was prepared by a laboratory ultrapure water machine (ULUPURE, UPT-II). NaCl was purchased from Aladdin Reagent for the preparation of mineralized water. All reagents were used right after being ready without further purification.

Example 1

The example was to illustrate hydrophobic nanoparticles prepared by using the method of the present disclosure.

According to a synthetic route of hydrophobic nanoparticles ($FAS@SiO_2$) shown in

FIG. 3A:

nano $SiO_2$ was dried in a vacuum oven of 120° C. for 3-4 h to remove adsorbed water. $SiO_2$ (5 g), trimethoxy(1H,1H,2H,2H-heptadecafluorodecyl)silane (FAS, 0.15 g) and an acetic acid solution (pH=4) were added to 20 mL of an acetone solution, the mixture was placed in an oil bath of ° C., and a reaction was carried out under stirring for 4-6 h under nitrogen protection. Centrifugation was performed at 8000 rpm for 5 min after cooling to obtain $FAS@SiO_2$ nanoparticles. Unreacted monomers were removed by a Soxhlet extraction method with xylene as a solvent. The purified $FAS@SiO_2$ was put into a vacuum oven of 120° C. to be dried for 5-6 h, and ground to obtain hydrophobic nanoparticles, labeled as Z1.

Comparative Example 1

Figure 3A:
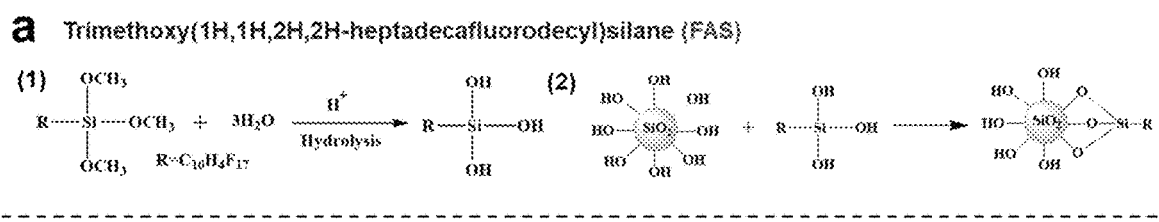
FIG. 3A is a schematic diagram of a synthesis route of hydrophobic nanoparticles (FAS@$SiO_2$) provided in Example 1 of the present disclosure.
Figure 3B:
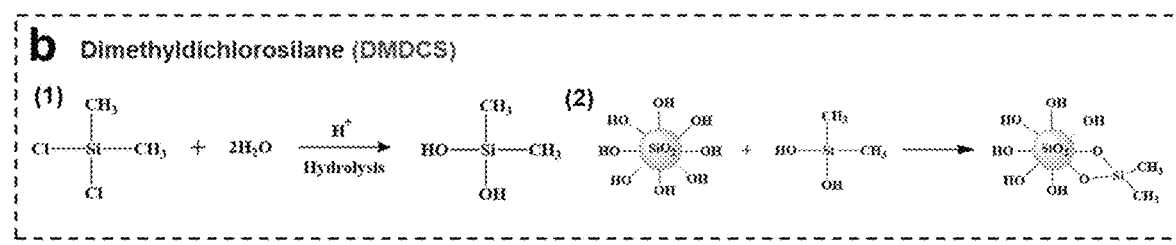
FIG. 3B is a schematic diagram of a synthesis route of hydrophobic nanoparticles (DMDCS@$SiO_2$) provided in Comparative example 1 of the present disclosure.

According to a synthetic route of hydrophobic nanoparticles ($DMDCS@SiO_2$) shown in FIG. 3B:

nano $SiO_2$ was dried in a vacuum oven of 120° C. for 3-4 h to remove adsorbed water. $SiO_2$ (5 g), dimethyldichlorosilane (DMDCS, 0.15 g) and an acetic acid solution (pH=4) were added to 20 mL of an acetone solution, the mixture was placed in an oil bath of 50° C., and a reaction was carried out under stirring for 4-6 h under nitrogen protection. Centrifugation was performed at 8000 rpm for min after cooling to obtain $DMDCS@SiO_2$ nanoparticles. Unreacted monomers were removed by a Soxhlet extraction method with xylene as a solvent. The purified $DMDCS@SiO_2$ was placed in a vacuum oven of 120° C. to be dried for 5-6 h, and ground to obtain hydrophobic nanoparticles, labeled as DZ1.

Comparative Example 2

Figure 3C:
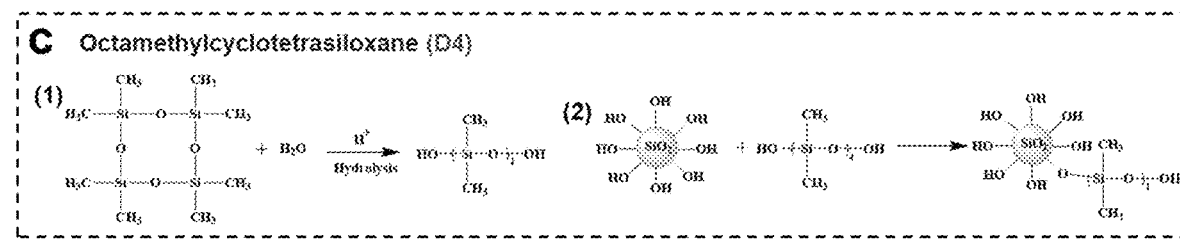
FIG. 3C is a schematic diagram of a synthesis route of hydrophobic nanoparticles (D4@$SiO_2$) provided in Comparative example 2 of the present disclosure.

According to a synthetic route of hydrophobic nanoparticles (D4 $@SiO_2$) shown in FIG. 3C:

nano $SiO_2$ was dried in a vacuum oven of 120° C. for 3-4 h to remove adsorbed water. $SiO_2$ (5 g), octamethylcyclotetrasiloxane (D4, 0.15 g) and an acetic acid solution (pH=4) were added to mL of an acetone solution, the mixture was placed in an oil bath of 50° C., and a reaction was carried out under stifling for 4-6 h under nitrogen protection. Centrifugation was performed at 8000 rpm for 5 min after cooling to obtain D4 $@SiO_2$ nanoparticles. Unreacted monomers were removed by a Soxhlet extraction method with xylene as a solvent. The purified $D4@SiO_2$ was put into a vacuum oven of 120° C. to be dried for 5-6 h, and ground to obtain hydrophobic nanoparticles, labeled as DZ2.

Figure 4A:
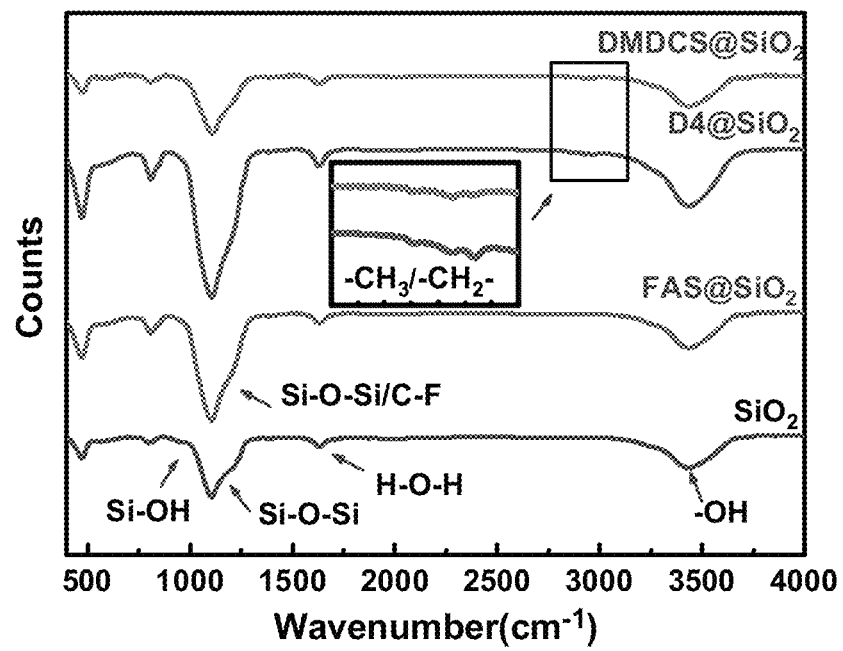
FIG. 4A shows FT-IR spectra of $SiO_2$, FAS@$SiO_2$, D4@$SiO_2$ and DMDCS@$SiO_2$ provided in Example 1, Comparative example 1 and Comparative example 2 of the present disclosure.

In the examples of the present disclosure, in Example 1, Comparative example 1, and Comparative example 2 above, FIG. 4A shows FT-IR spectra of $SiO_2$, $FAS@SiO_2$, $D4@SiO_2$ and $DMDCS@SiO_2$. Absorption peaks at 1118 $cm^{-1}$, 801 $cm^{-1}$ and 482 $cm^{-1}$ are characteristic peaks of stretching vibration and bending vibration of Si—O—Si in $SiO_2$. Absorption bands at 3460 $cm^{-1}$ and 1638 $cm^{-1}$ are symmetric stretching and bending vibration absorption peaks of —OH in bound water and adsorbed water, respectively. In the spectrum of $SiO_2$, an absorption band at 965 $cm^{-1}$ is assigned to Si—OH bending. The disappearance of the Si—OH bending phenomenon in the spectra of $FAS@SiO_2$, $D4@SiO_2$ and $DMDCS@SiO_2$ indicates that silanol generated by hydrolysis and hydroxy on the surface are subjected to a condensation reaction. In the spectra of $D4@SiO_2$ and $DMDCS@SiO_2$, one absorption band belonging to —$CH_3$/—$CH_2$ appears (2850 $cm^{-1}$-2960 cm$^{-1}$). These results indicate that D4 and DMDCS are successfully grafted on the SiO$_2$ surface. The characteristic absorption peak of a C—F bond in the spectrum of FAS@SiO$_2$ is not obvious (1210 cm$^{-1}$), which may be due to a broad characteristic peak at 1118 cm$^{-1}$ coinciding with the C—F bond.

Figure 4B:
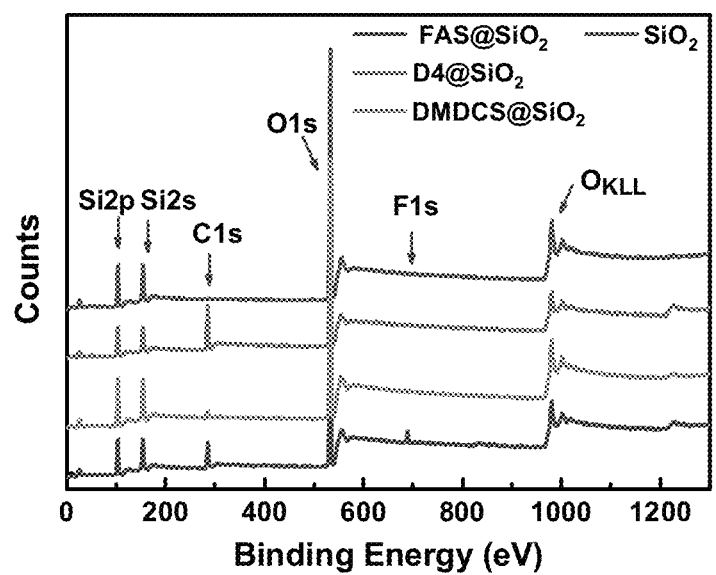
FIG. 4B shows X-ray photoelectron spectroscopy (XPS) spectra of $SiO_2$, FAS@$SiO_2$, D4@$SiO_2$ and DMDCS@$SiO_2$ provided in Example 1, Comparative example 1 and Comparative example 2 of the present disclosure.
Figure 4C:
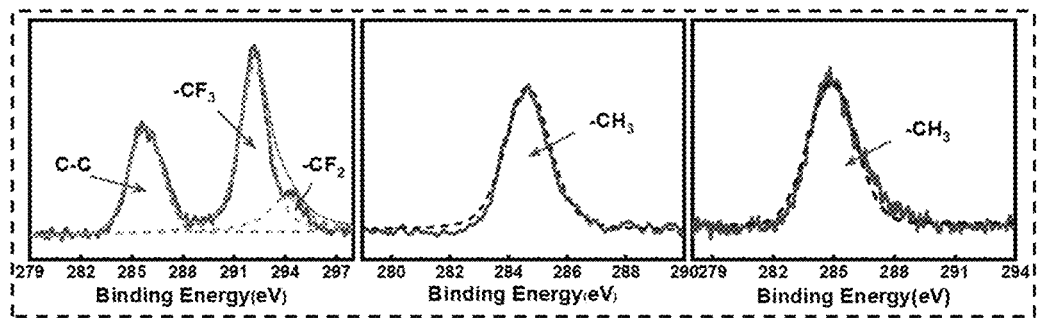
FIG. 4C is a high-resolution C1s spectrum of each sample provided in Example 1, Comparative example 1 and Comparative example 2 of the present disclosure.

FIG. 4B shows X-ray photoelectron spectroscopy (XPS) spectra of SiO$_2$, FAS@SiO$_2$, D4@SiO$_2$ and DMDCS@SiO$_2$. Main peaks observed at 292.16 eV, 533.14 eV, 689.26 eV, and 103.97 eV correspond to C1s, O1s, F1s, and Si2p, respectively. The elemental composition on the surface of modified SiO$_2$ is shown in Table 1. The F content of FAS@SiO$_2$ reaches 24.13% and the C/F atomic ratio is 0.47, which is consistent with the theoretical ratio in a FAS reagent. The C content in DMDCS@SiO$_2$ is only 5.73% compared with 32.01% of the C content in D4@SiO$_2$. This is mainly because the D4 molecule contains 4 times more methyl than the DMDCS molecule. A high-resolution C1s spectrum of each sample is shown in FIG. 4C. For FAS@SiO$_2$, the C1s spectrum is decomposed into 3 peaks at 285.8 eV, 292.2 eV and 294.1 eV, assigned to C—C, —CF$_3$ and —CF$_2$, respectively. Only one peak appears for both D4@SiO$_2$ and DMDCS@SiO$_2$ (284.8 eV, —CH$_3$). Thus, FT-IR and XPS results indicate that the SiO$_2$ surface was successfully grafted with various hydrophobic groups.

TABLE 1

| Name | SiO$_2$ | FAS@SiO$_2$ | D4@SiO$_2$, | DMDCS@SiO$_2$ |
|---|---|---|---|---|
| C1s (Atom %) | — | 10.56 | 32.01 | 5.73 |
| O1s (Atom %) | 67.66 | 46.98 | 45.58 | 61.53 |
| Si2p (Atom %) | 32.34 | 18.33 | 22.42 | 32.74 |
| F1s (Atom %) | — | 24.13 | — | — |

Figure 5A:
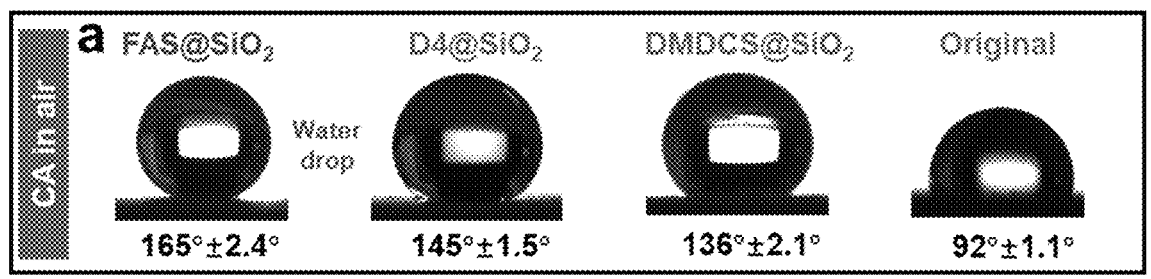
FIG. 5A is a schematic diagram showing that a water contact angle on the surface of bare glass in the wettability of $SiO_2$ modified with different hydrophobic groups provided in Example 1, Comparative example 1 and Comparative example 2 of the present disclosure is about 92°, with the increase of a water contact angle in air to 165°±2.4°, 145°±1.5° and 136°±2.1° after surface coverage of FAS@$SiO_2$, D4@$SiO_2$ and DMDCS@$SiO_2$, respectively.

In the examples of the present disclosure, as shown in FIG. 5A, a water contact angle on the surface of bare glass in the wettability of SiO$_2$ modified with different hydrophobic groups is about 92°±1.1°, and after surface coverage of D4@SiO$_2$ and DMDCS@SiO$_2$, a water contact angle in air increases to 145°±1.5° and 136°±2.1°, respectively. The results indicate that the hydrophobicity after D4 modification is slightly higher than that after DMDCS modification, which is consistent with the XPS results, mainly because the hydrophobic methyl content of the D4@SiO$_2$ surface is greater than that of the DMDCS@SiO$_2$ surface.

Figure 5B:
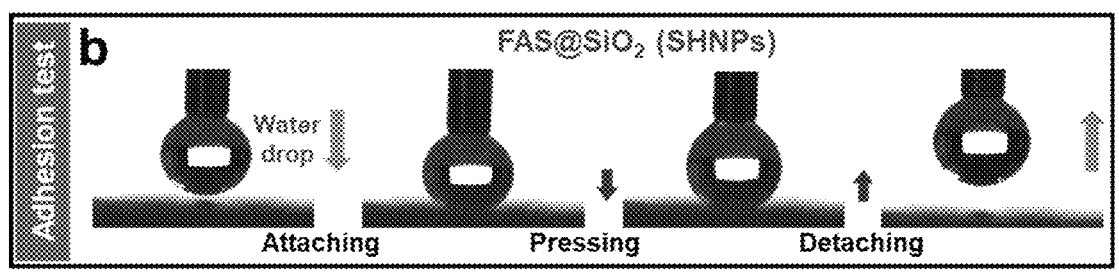
FIG. 5B is a graph showing that a contact angle in the wettability of $SiO_2$ modified with different hydrophobic groups provided in Example 1 of the present disclosure remains unchanged during the whole attaching and pressing process, and even when water drops are peeled off from a SHNP coated wafer, the water drops will not be deformed due to adhesion.

In the examples of the present disclosure, FAS@SiO$_2$ has a superhydrophobicity of 165°±2.4° because fluorine-containing materials generally have a lower surface energy than carbon-containing materials. Thus, FAS@SiO$_2$ is determined to be optimal SHNPs. The superhydrophobicity of SHNPs was further demonstrated by an adhesion experiment, as shown in FIG. 5B. A contact angle in the wettability of SiO$_2$ modified with different hydrophobic groups remains unchanged during the whole attaching and pressing process, and even when water drops are peeled off from a SHNP coated wafer, the water drops will not be deformed due to adhesion.

Example 2

The example was to illustrate hydrophobic nanoparticles prepared by using the method of the present disclosure.

Hydrophobic nanoparticles (FAS@SiO$_2$) were prepared according to the same method as that in Example 1, except that:

the amount of trimethoxy(1H,1H,2H,2H-heptadecafluorodecyl)silane used was 0.2 g relative to 10 g of SiO$_2$. The final prepared FAS@SiO$_2$ was labelled as Z2.

Example 3

The example was to illustrate hydrophobic nanoparticles prepared by using the method of the present disclosure.

Hydrophobic nanoparticles (FAS@SiO$_2$) were prepared according to the same method as that in Example 1, except that:

the amount of trimethoxy(1H,1H,2H,2H-heptadecafluorodecyl)silane used was 0.4 g relative to 10 g of SiO$_2$. The final prepared FAS@SiO$_2$ was labelled as Z3.

Example 4

The example was to illustrate hydrophobic nanoparticles prepared by using the method of the present disclosure.

Hydrophobic nanoparticles (FAS@SiO$_2$) were prepared according to the same method as that in Example 1, except that:

the amount of trimethoxy(1H,1H,2H,2H-heptadecafluorodecyl)silane used was 0.1 g relative to 10 g of SiO$_2$. The final prepared FAS@SiO$_2$ was labelled as Z4.

Example 5

The example was to illustrate hydrophobic nanoparticles prepared by using the method of the present disclosure.

Hydrophobic nanoparticles (FAS@SiO$_2$) were prepared according to the same method as that in Example 1, except that:

an acetic acid solution was added dropwise to adjust a pH of the reaction system to be 3.

The final prepared FAS@SiO$_2$ was labelled as Z5.

Example 6

The example was to illustrate a superhydrophobic nanofluid prepared by the method of the present disclosure, the method comprising:

(1) adding an ethanol solution as a dispersing aid in an amount so that the superhydrophobic nanoparticles (labeled as Z1) prepared in Example 1 were immersed to obtain a solution I, wherein a mass ratio of the superhydrophobic nanoparticles (FAS@SiO$_2$) in the mixed solution to water was 0.10:100;

(2) dissolving a composite surfactant having a mass concentration of 0.1% (wherein a mass ratio of sodium alpha-olefin sulfonate (AOS) to lauramidopropyl betaine (LAB) was 1:1) in water for a second contact, and adding the obtained mixed solution into the solution I to obtain a solution II; and (3) subjecting the solution II to ultrasonic dispersion at a power of 500 W for 12 h at ° C. to obtain a superhydrophobic functional nanofluid, labeled as Si.

Figure 6:
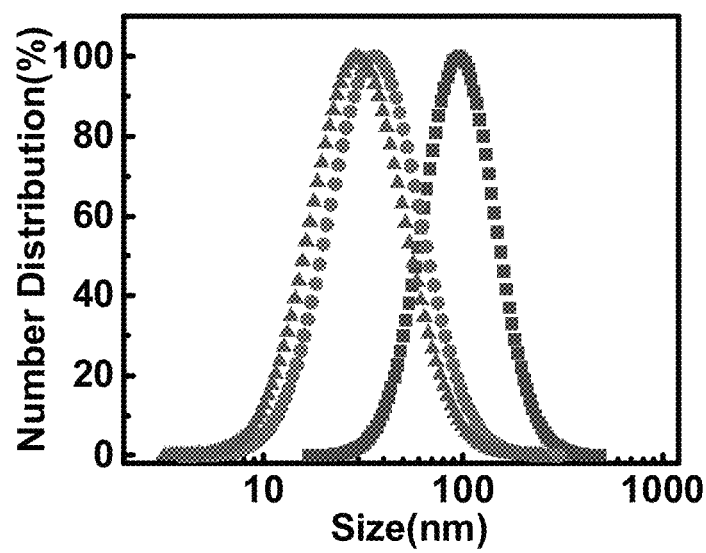
FIG. 6 is a graph of particle size distribution results for a nanofluid provided in Example 6 of the present disclosure.

In the dispersion of SHNPs with different surfactants, the SHNP nanofluid was clear and transparent after addition of 0.1% of the composite surfactant (wherein the mass ratio of sodium alpha-olefin sulfonate (AOS) to lauramidopropyl betaine (LAB) was 1:1). The anionic surfactant AOS, in addition to providing a hydrophilic head group, is also effective in improving the electrostatic repulsion between SHNPs, increasing the stability of the SHNP functional nanofluid. The particle size distribution results (FIG. 6) show that SiO$_2$ without surfactants is easily agglomerated in water, and has a particle size of about 110 nm. The addition of surfactants significantly increased the stability of the nanofluid, and a median particle size of the $SiO_2$+composite surfactant nanofluid and a median particle size of the SHNPs+composite surfactant nanofluid are 21 nm and 28 nm, respectively.

Figure 7A:
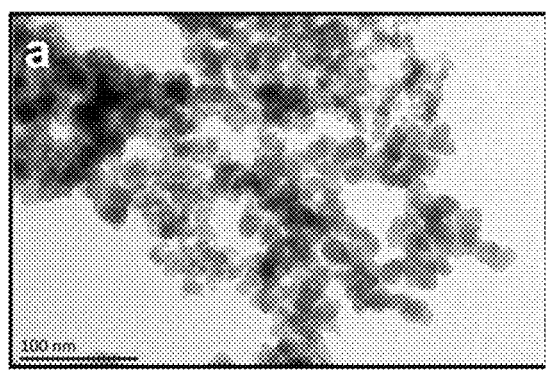
FIG. 7A is a graph of TEM results showing the effect of a particle size of nano $SiO_2$ before FAS modification in transmission electron microscopy of nanoparticles according to Example 6 of the present disclosure.
Figure 7B:
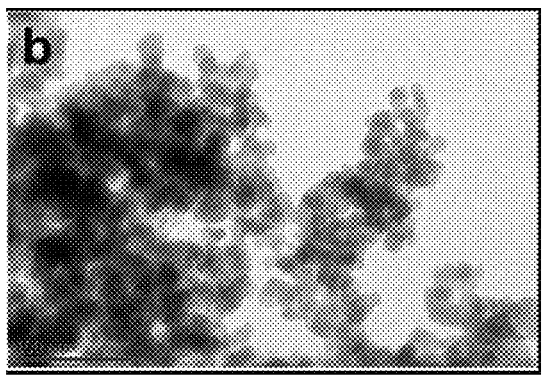
FIG. 7B is a graph of TEM results showing the effect of a particle size of nano $SiO_2$ after FAS modification in transmission electron microscopy of nanoparticles according to Example 6 of the present disclosure.

FIG. 7A is a graph of TEM results showing the effect of a particle size of nano $SiO_2$ before FAS modification in transmission electron microscopy of nanoparticles; and FIG. 7B is a graph of TEM results showing the effect of a particle size of nano $SiO_2$ after FAS modification in transmission electron microscopy of nanoparticles; wherein neither FIG. 7A nor FIG. 7B changes significantly, which is consistent with the DLS results. The final optimal nanofluid composition is SHNPs and AOS/LAB.

Figure 8A:
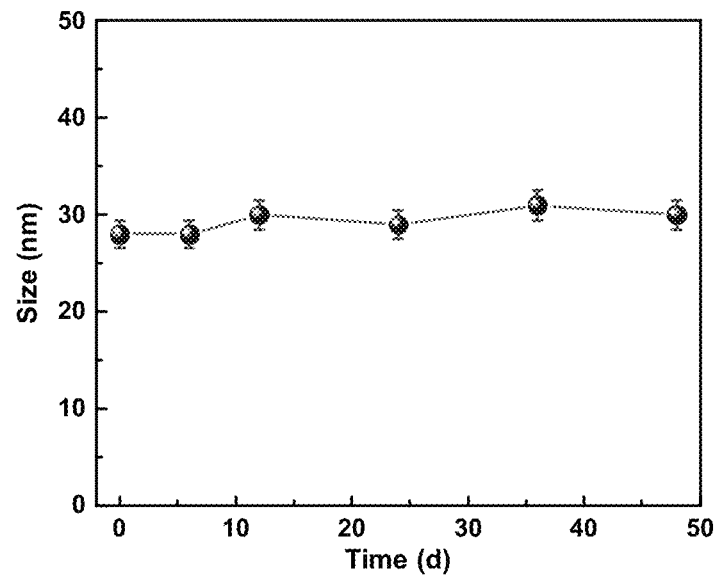
FIG. 8A is a graph showing the change in particle size of a SHNP functional nanofluid after long-term aging according to Example 6 of the present disclosure.
Figure 8B:
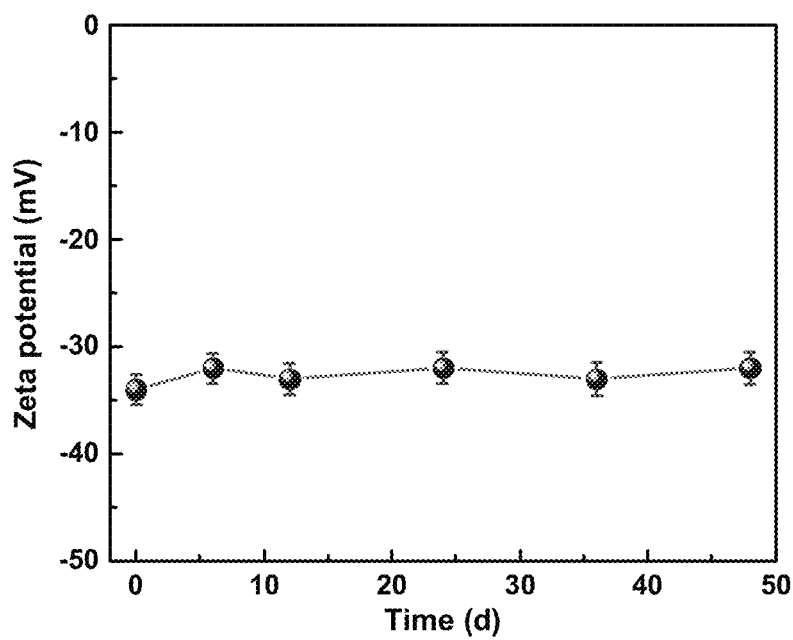
FIG. 8B is a graph showing the change in potential of the SHNP functional nanofluid after long-term aging according to Example 6 of the present disclosure.

FIG. 8A is a graph showing the change in particle size of a SHNP functional nanofluid after long-term aging, and FIG. 8B is a graph showing the change in potential of the SHNP functional nanofluid after long-term aging. The results show that the SHNP functional nanofluid can remain stable within 48 d, with a median particle size being maintained to be about 30 nm and a Zeta potential value being maintained to be −32 mV.

Figure 9A:
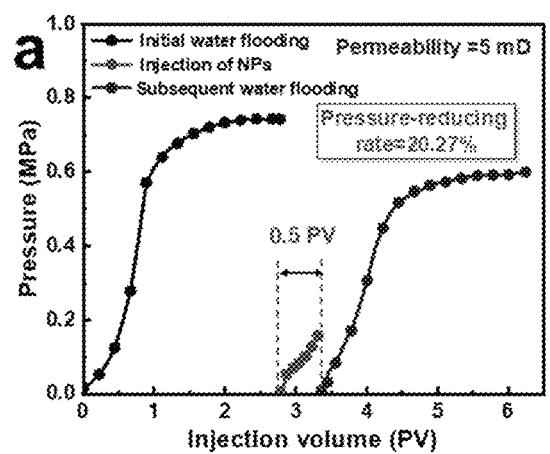
FIG. 9A is a graph showing the change in injection pressure of a NP nanofluid provided in Example 6 of the present disclosure in a core with a permeability of 5 mD.
Figure 9B:
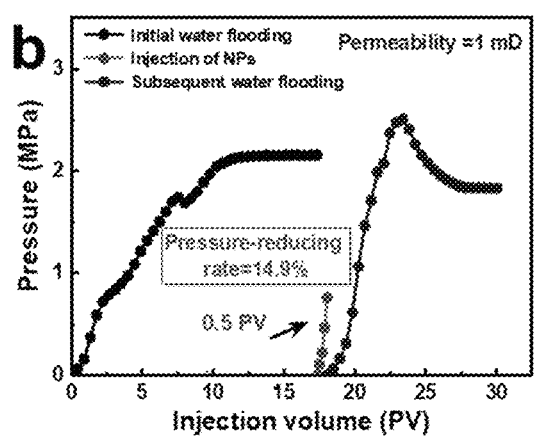
FIG. 9B is a graph showing the change in injection pressure of the NP nanofluid provided in Example 6 of the present disclosure in a core with a permeability of 1 mD.
Figure 9C:
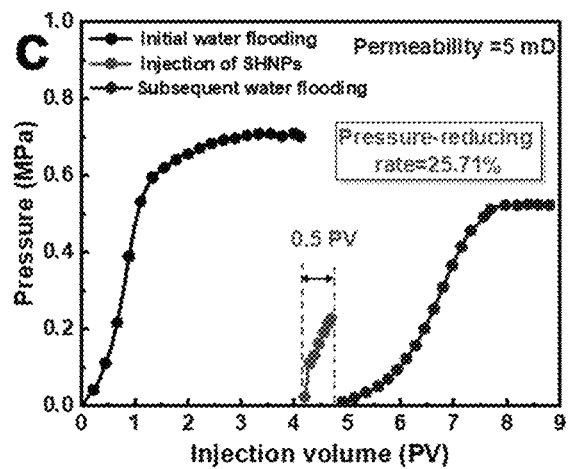
FIG. 9C shows the change in injection pressure of a SHNP nanofluid provided in Example 6 of the present disclosure in the core with a permeability of 5 mD.
Figure 9D:
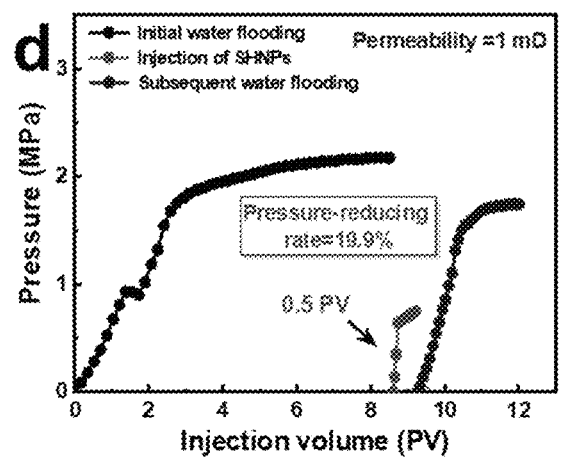
FIG. 9D is a graph showing the change in injection pressure of the SHNP nanofluid provided in Example 6 of the present disclosure in the core with a permeability of 1 mD.
Figure 9E:
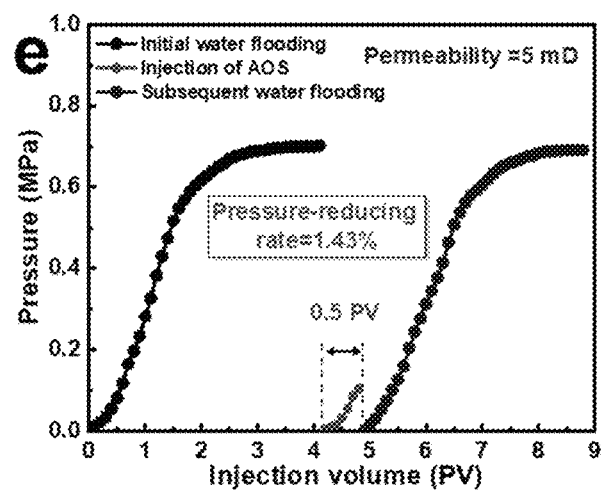
FIG. 9E is a graph showing the change in injection pressure of a surfactant solution alone provided in Example 6 of the present disclosure in the core of 5 mD.
Figure 9F:
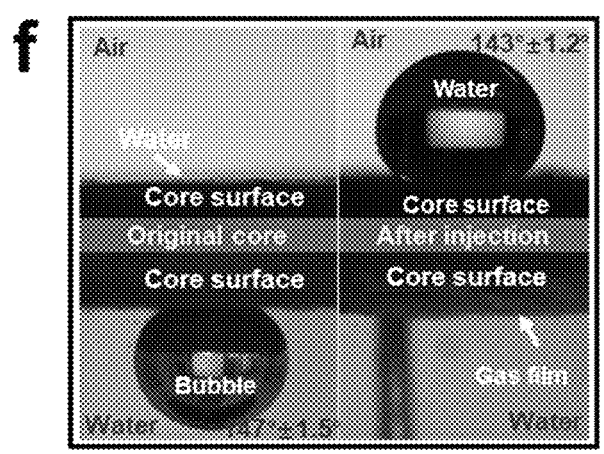
FIG. 9F is a graph showing a water contact angle in air on the core surface and a bubble contact angle in water before (left) and after (right) injection of the SHNP nanofluid provided in Example 6 of the present disclosure.

FIGS. 9A and 9B respectively show the change in injection pressure of a NP nanofluid in a core with a permeability of 5 mD and in a core with a permeability of 1 mD; FIGS. 9C and 9D respectively show the change in injection pressure of a SHNP nanofluid in the core with a permeability of 5 mD and in the core with a permeability of 1 mD; FIG. 9E shows the change in injection pressure of a surfactant solution alone in the core with a permeability of 5 mD; FIG. 9F shows a water contact angle in air on the core surface and a bubble contact angle in water before (left) and after (right) injection of the SHNP nanofluid (f). To verify the drag reduction effect of the prepared SHNP nanofluid in the core, core flooding experiments with different permeabilities were performed with a hydrophilic silica (NPs)-containing nanofluid as a control group. As shown in FIG. 9A, for the core with a permeability of 5 mD, the initial waterflooding pressure is 0.74 MPa. After injection of the NP nanofluid, the subsequent waterflooding pressure is reduced to 0.59 MPa, and a drag reduction ratio is 20.27%. Under the same conditions, the waterflooding pressure is reduced from 0.70 MPa to 0.52 MPa before and after injection of the SHNP nanofluid, and the drag reduction ratio reaches 25.71% (FIG. 9C). The drag reduction capacity of the SHNP nanofluid is improved by about 1.26 times compared with the hydrophilic NP system. At a lower permeability (1 mD), the drag reduction advantage of the SHNP nanofluid is more obvious, reaching 1.34 times that of the NP nanofluid, and a drag reduction ratio of the SHNP nanofluid and a drag reduction ratio of the NP nanofluid are 19.9% (FIG. 9D) and 14.9% (FIG. 9B), respectively. To distinguish the contribution of surfactants and nanomaterials to core drag reduction, a core drag reduction experiment with only surfactant injection was performed. The results are shown in FIG. 9E, a pressure-reducing rate is only 1.43%, indicating that the surfactant alone does not significantly improve the drag reduction. In FIG. 9F, the original core surface exhibits strong hydrophilicity in air, and after the flooding ends, the surface becomes strongly hydrophobic due to adsorption of SHNPs. The contact angle of bubbles on the original core surface was approximately 147°. After adsorption of SHNPs, bubbles spread on the core surface with a contact angle of almost 0°, indicating that the bubbles exist in the form of a gaseous film on the core surface adsorbed with SHNPs.

Figure 10A:
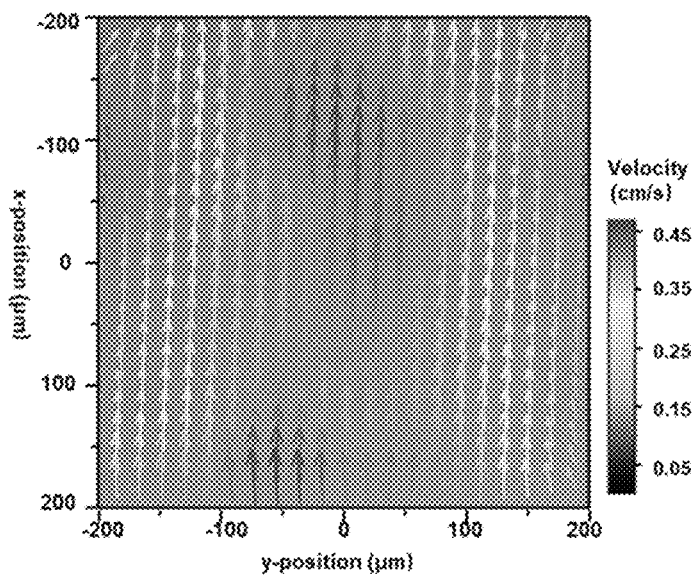
FIG. 10A is a flow field distribution diagram of subsequent waterflooding in a simulated channel after injection of deionized water according to Example 6 of the present disclosure.
Figure 10B:
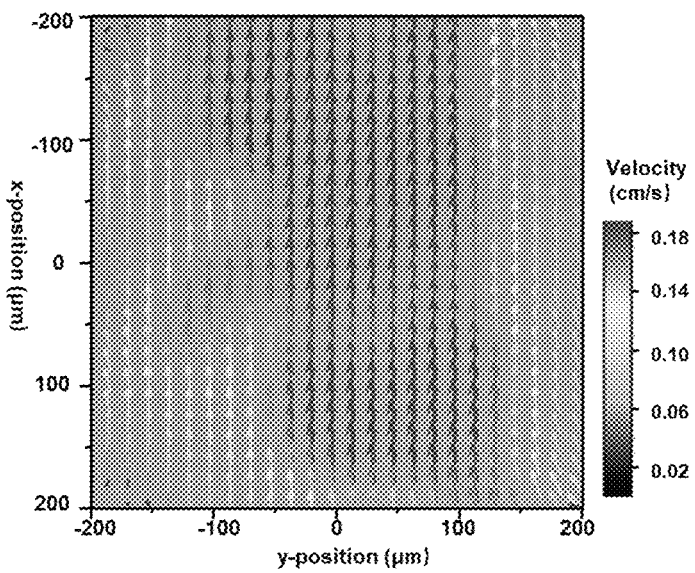
FIG. 10B is a flow field distribution diagram of subsequent waterflooding in a simulated channel after injection of a NP nanofluid according to Example 6 of the present disclosure.
Figure 10C:
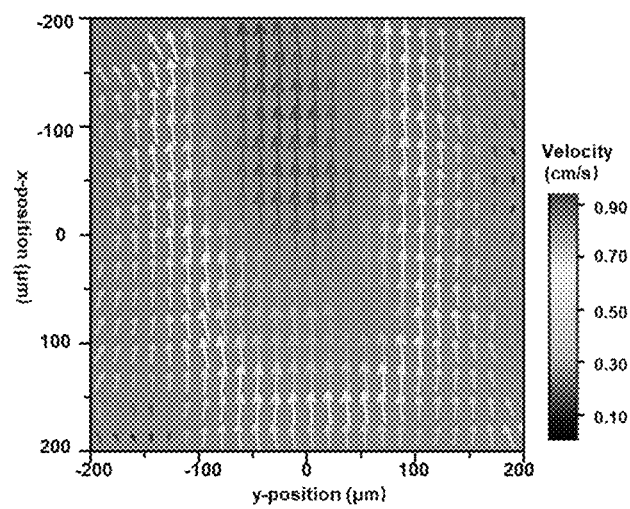
FIG. 10C is a flow field distribution diagram of subsequent waterflooding in a simulated channel after injection of a SHNP nanofluid according to Example 6 of the present disclosure.
Figure 10D:
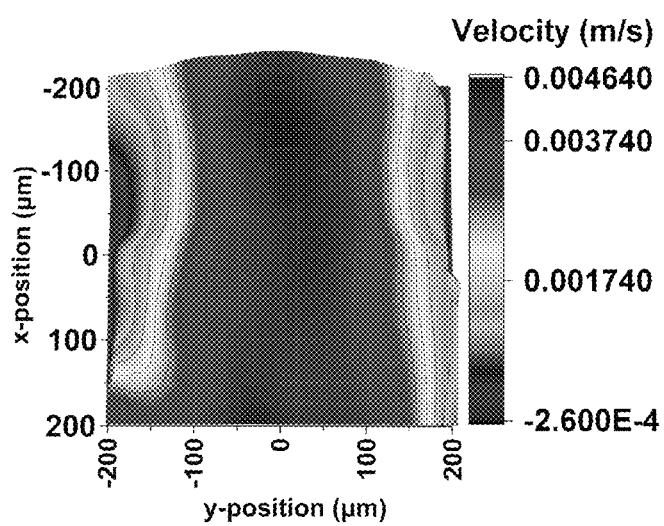
FIG. 10D is a 2D velocity field diagram after injection of deionized water according to Example 6 of the present disclosure.
Figure 10E:
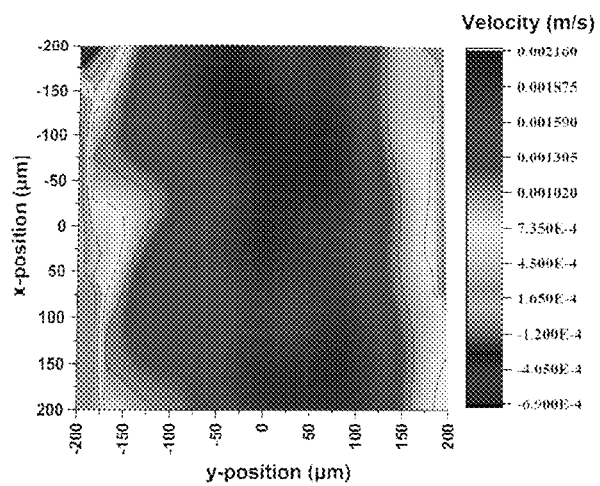
FIG. 10E is a 2D velocity field diagram after injection of a NP nanofluid according to Example 6 of the present disclosure.
Figure 10F:
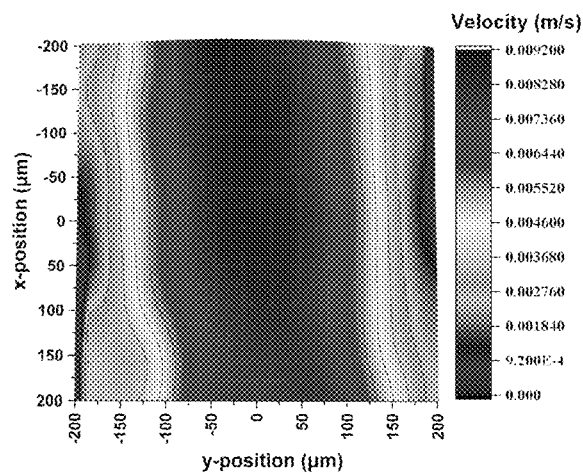
FIG. 10F is a 2D velocity field diagram after injection of a SHNP nanofluid according to Example 6 of the present disclosure.
Figure 10G:
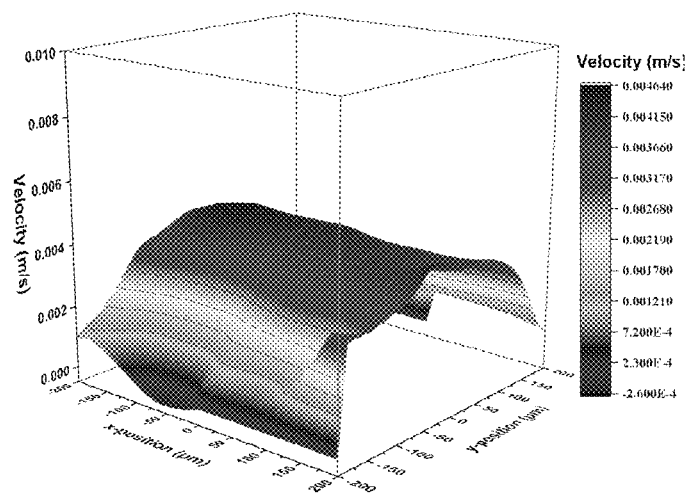
FIG. 10G is a 3D velocity field diagram after injection of deionized water, according to Example 6 of the present disclosure.
Figure 10H:
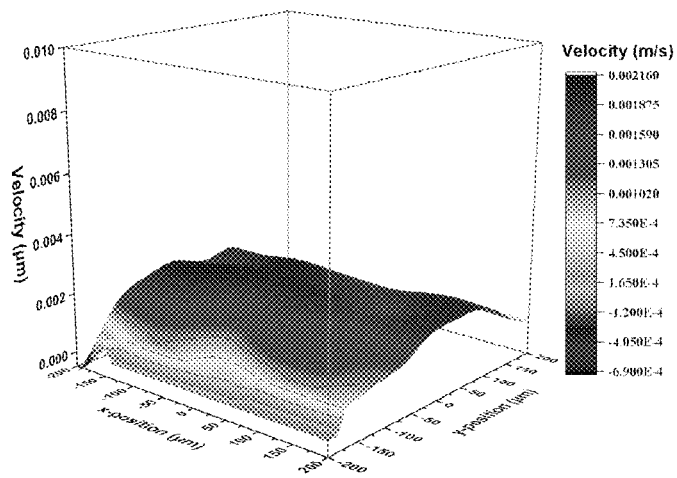
FIG. 10H is a 3D velocity field diagram after injection of the NP nanofluid according to Example 6 of the present disclosure.
Figure 10I:
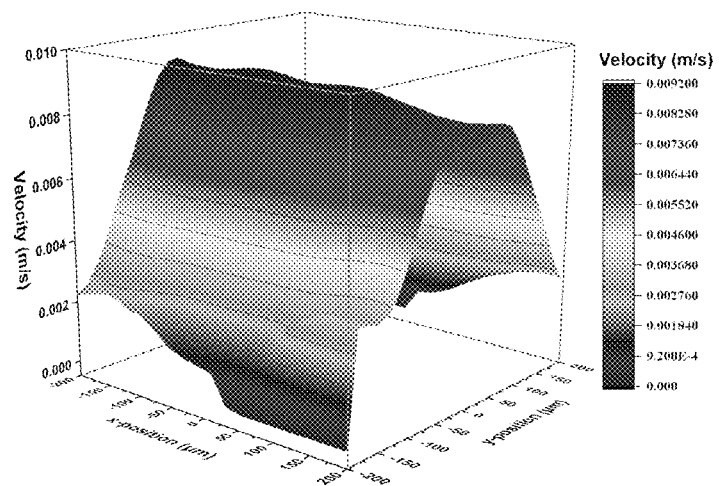
FIG. 10I is a 3D velocity field diagram after injection of the SHNP nanofluid according to Example 6 of the present disclosure.

FIGS. 10A, 10B, and 10C respectively show flow field distribution of subsequent waterflooding in a simulated channel, and correspond to after injection of deionized water, after injection of the NP nanofluid, and after injection of the SHNP nanofluid, respectively; FIGS. 10D and 10G show 2D/3D velocity fields after injection of deionized water; FIGS. 10E and 10H show 2D/3D velocity fields after injection of the NP nanofluid; and FIGS. 10F and 10I show 2D/3D velocity fields after injection of the SHNP nanofluid. In a control experiment where no nanomaterial was added, a water flow uniformly flows along a channel with a central flow rate of 0.464 cm/s. An adsorption interface of hydrophilic NPs produces an obvious "viscous" phenomenon (as shown in FIG. 10E), with a central flow rate of water being 0.216 cm/s, which is 53.45% lower than that of pure water, and there is no obvious regular liquid-solid boundary.

In the examples of the present disclosure, in FIG. 10F, after injection of the SHNP nanofluid, a central flow rate is significantly increased to 0.920 cm/s during the subsequent water flooding process, which is 98.27% higher than that of pure water, and is 3.26 times that of the NP nanofluid. The comparison results of the central rate can be more clearly obtained by 3D velocity field distribution (FIGS. 10G-10H). The significant increase in flow rate indicates that SHNPs can effectively reduce fluid flow resistance and increase the injection volume. In addition, significant liquid-solid layering is observed in FIG. 10F, which may be due to the occurrence of a "gas film" slip phenomenon.

Figure 11A:
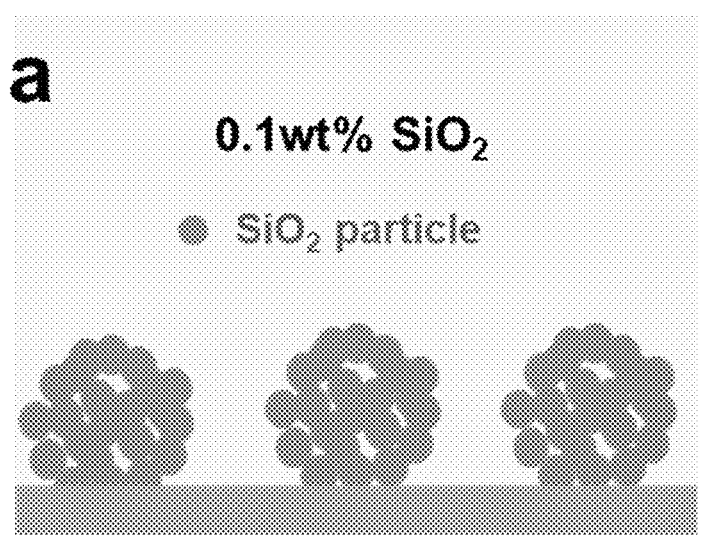
FIG. 11A is a diagram showing a mechanism of adsorption and assembly of a surfactant-free $SiO_2$ nanofluid provided in Example 6 of the present disclosure on a wall.
Figure 11B:
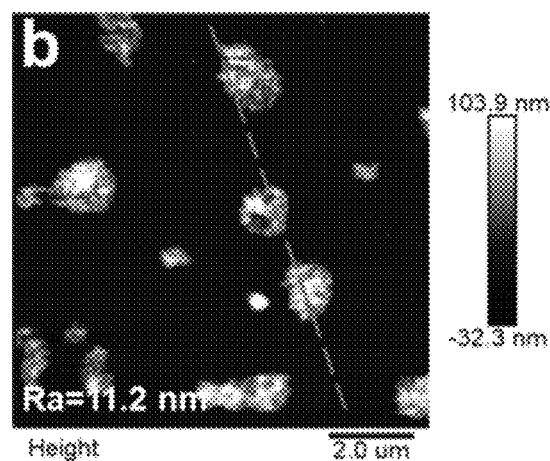
FIG. 11B is an AFM image of adsorption and assembly of the surfactant-free $SiO_2$ nanofluid provided in Example 6 of the present disclosure on the wall.
Figure 11C:
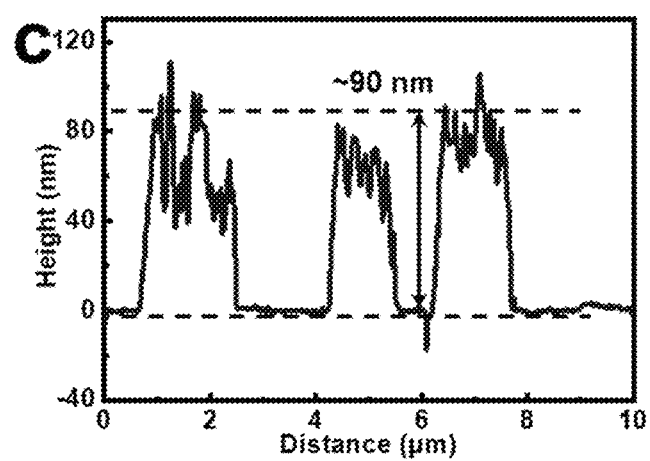
FIG. 11C is a longitudinal cross-sectional view of adsorption and assembly of the surfactant-free $SiO_2$ nanofluid provided in Example 6 of the present disclosure on the wall.
Figure 11D:
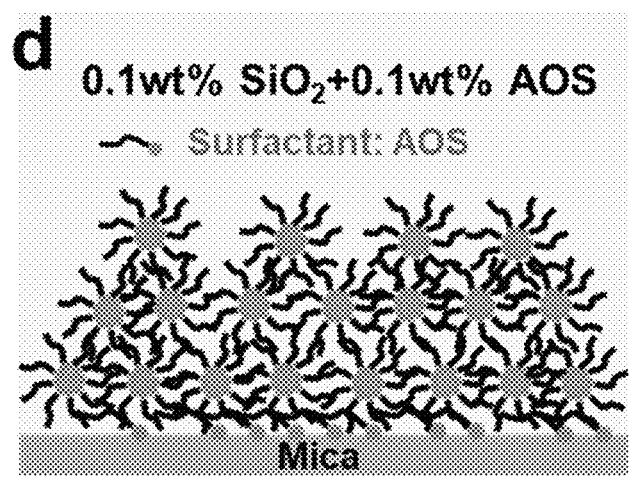
FIG. 11D is a diagram showing a mechanism of adsorption and assembly of the NP nanofluid provided in Example 6 of the present disclosure on a wall.
Figure 11E:
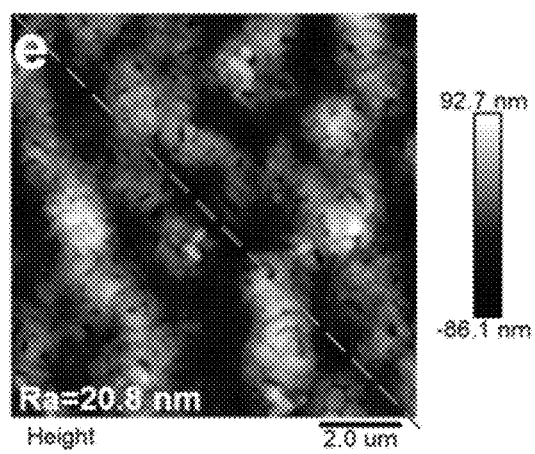
FIG. 11E is an AFM image of adsorption and assembly of the NP nanofluid provided in Example 6 of the present disclosure on the wall.
Figure 11F:
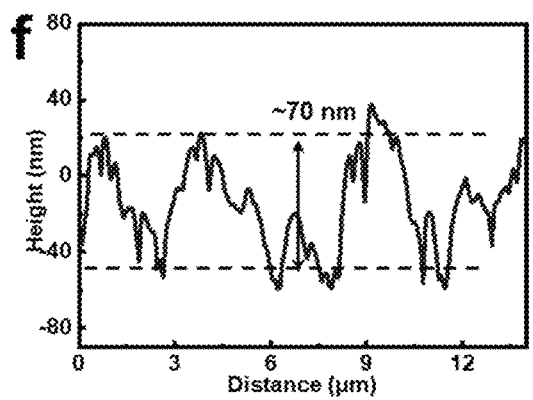
FIG. 11F is a longitudinal cross-sectional view of adsorption and assembly of the NP nanofluid provided in Example 6 of the present disclosure on the wall.
Figure 11G:
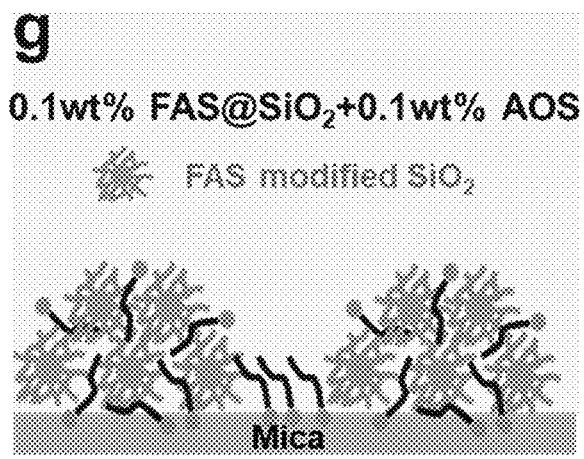
FIG. 11G is a diagram showing a mechanism of adsorption and assembly of the SHNP nanofluid provided in Example 6 of the present disclosure on a wall.
Figure 11H:
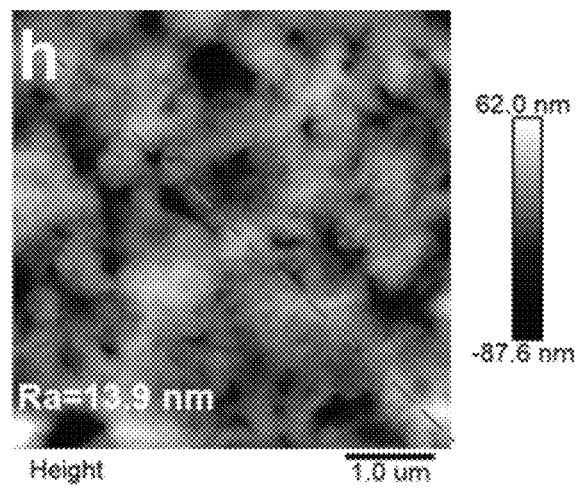
FIG. 11H is an AFM image of adsorption and assembly of the SHNP nanofluid provided in Example 6 of the present disclosure on the wall.
Figure 11I:
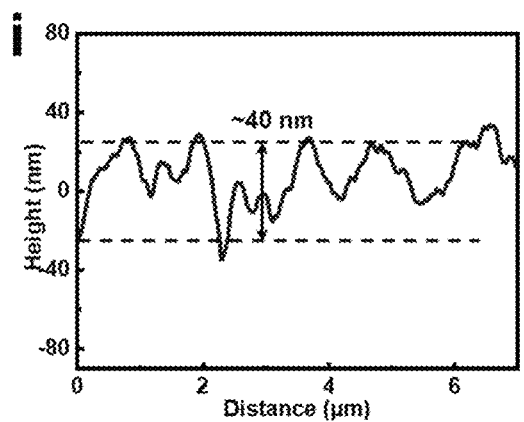
FIG. 11I is a longitudinal cross-sectional view of adsorption and assembly of the SHNP nanofluid provided in Example 6 of the present disclosure on the wall.

In the examples of the present disclosure, a diagram showing a mechanism of adsorption and assembly of different nanofluids on a wall, an AFM image of adsorption and assembly of different nanofluids on a wall and a longitudinal cross-sectional view of adsorption and assembly of different nanofluids on a wall include: FIG. 11A is a diagram showing a mechanism of adsorption and assembly of a surfactant-free $SiO_2$ nanofluid on a wall, FIG. 11B is an AFM image of adsorption and assembly of the surfactant-free $SiO_2$ nanofluid on the wall, and FIG. 11C is a longitudinal cross-sectional view of adsorption and assembly of the surfactant-free $SiO_2$ nanofluid on the wall;

FIG. 11D is a diagram showing a mechanism of adsorption and assembly of the NP nanofluid on a wall, FIG. 11E is an AFM image of adsorption and assembly of the NP nanofluid on the wall, and FIG. 11F is a longitudinal cross-sectional view of adsorption and assembly of the NP nanofluid on the wall;

FIG. 11G is a diagram showing a mechanism of adsorption and assembly of the SHNP nanofluid on a wall, FIG. 11H is an AFM image of adsorption and assembly of the SHNP nanofluid on the wall, and FIG. 11I is a longitudinal cross-sectional view of adsorption and assembly of the SHNP nanofluid on the wall;

As shown in FIGS. 11A-11C, pure $SiO_2$ is easy to agglomerate in water and settle on the surface, and the formed agglomerate has a size of about 90 nm. The surfactant-containing NP nanofluid and the surfactant-containing SHNP nanofluid have good dispersion stability, and can be uniformly adsorbed on the solid surface, thus assembling to form a large number of uniform micro/nanostructures. Under the same conditions, hydrophilic NPs are more easily adsorbed on the hydrophilic solid surface. The adsorption thickness of NPs is about 70 nm, and the root mean square (RMS) roughness is 20.8 nm (FIG. 11E and FIG. 11F), while the adsorption thickness of SHNPs is only 40 nm, and the RMS is 13.9 nm (FIG. 11H and FIG. 11I), which indicates that micro/nano rough structures formed by the NP nanofluid are more abundant than those of the SHNP nanofluid, but both the core flooding experimental results and the visual flow field experiment indicate that SHNPs have better drag reduction and augmented injection effects, further demonstrating that the assembled structure of superhydrophobic nanoparticles has the special properties of gas film drag reduction in addition to roughness reduction.

Figure 12:
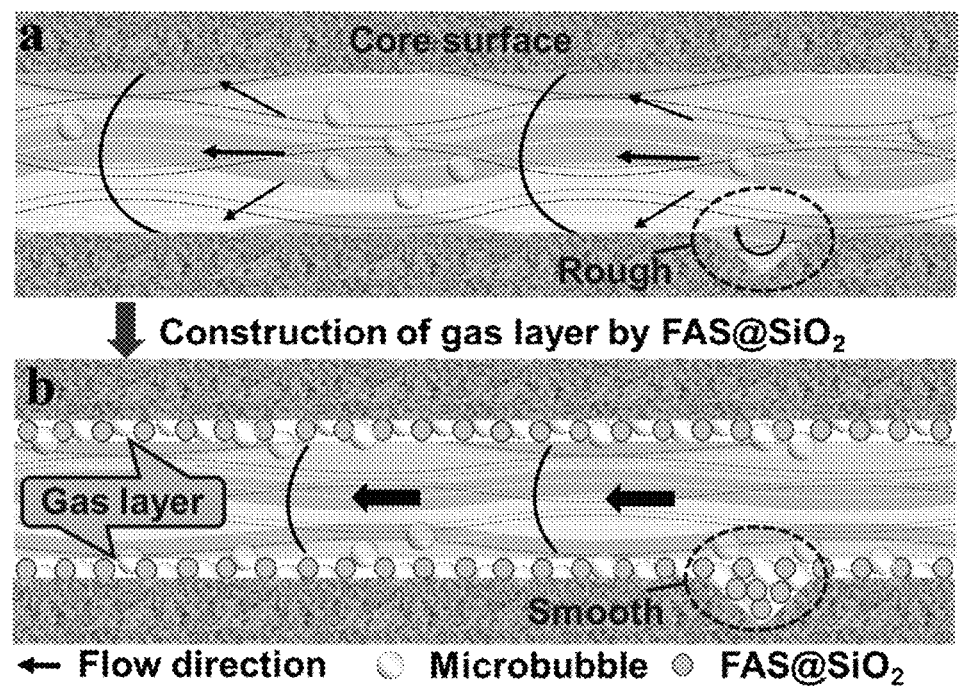
FIG. 12 is a diagram showing a superhydrophobic interfacial nano-gas film drag reduction mechanism of SHNPs in Example 6 of the present disclosure.

FIG. 12 shows that during the waterflooding process in a superhydrophobic interfacial nano-gas film drag reduction mechanism of SHNPs in the example of the present disclosure, the core surface is rough, and a large amount of waterflooding energy is lost on the pore wall, resulting in higher waterflooding pressure (a panel (a) in FIG. 12).

Through surfactant dispersion, SHNPs can be successfully injected into the formation (a panel (b) in FIG. 12), and SHNPs are adsorbed on the core surface and a large amount of hydrophobic rough structures are formed within a certain closing-in time. On one hand, the micro/nano rough structure can effectively reduce the roughness of the core surface, and suppress wall turbulence; in addition, adsorption of SHNPs completely changes the wettability of the core surface, after adsorption of SHNPs, microbubbles spread on the core, and the contact angle is almost indicating that bubbles exist in the form of a gaseous film on the modified surface of SHNPs. Therefore, the superhydrophobic interface is successfully constructed on the core surface through adsorption of SHNPs, and a gaseous film is formed, a liquid-solid interface is converted into a liquid-gas-solid interface through a barrier effect of a gas film, and the large resistance generated by liquid-solid direct contact is reduced, thereby improving the waterflooding effect.

Example 7

This example was to illustrate a superhydrophobic nanofluid prepared by using the method of the present disclosure.
(1) an ethanol solution as a dispersing aid was added in an amount so that the superhydrophobic nanoparticles (labeled as Z2) prepared in Example 2 were immersed to obtain a solution I, wherein a mass ratio of the superhydrophobic nanoparticles (FAS@SiO$_2$) in the mixed solution to water was 0.20:100;
(2) a composite surfactant having a mass concentration of 0.1% (wherein a mass ratio of sodium alpha-olefin sulfonate (AOS) to lauramidopropyl betaine (LAB) was 1:1) was dissolved in water for a second contact, and the obtained mixed solution was added into the solution I to obtain a solution II; and
(3) the solution II was subjected to ultrasonic dispersion at a power of 500 W for 12 h at ° C. to obtain a superhydrophobic functional nanofluid, labeled as S2.

Example 8

This example was to illustrate a superhydrophobic nanofluid prepared by using the method of the present disclosure.
(1) an ethanol solution as a dispersing aid was added in an amount so that the superhydrophobic nanoparticles (labeled as Z3) prepared in Example 3 were immersed to obtain a solution I, wherein a mass ratio of the superhydrophobic nanoparticles (FAS@SiO$_2$) in the mixed solution to water was 0.05:100;
(2) a composite surfactant having a mass concentration of 0.1% (wherein a mass ratio of sodium alpha-olefin sulfonate (AOS) to lauramidopropyl betaine (LAB) was 1:1) was dissolved in water for a second contact, and the obtained mixed solution was added into the solution I to obtain a solution II; and
(3) the solution II was subjected to ultrasonic dispersion at a power of 500 W for 12 h at ° C. to obtain a superhydrophobic functional nanofluid, labeled as S3.

Example 9

This example was to illustrate a superhydrophobic nanofluid prepared by using the method of the present disclosure.
(1) an ethanol solution as a dispersing aid was added in an amount so that the superhydrophobic nanoparticles (labeled as Z4) prepared in Example 4 were immersed to obtain a solution I, wherein a mass ratio of the superhydrophobic nanoparticles (FAS@SiO$_2$) in the mixed solution to water was 0.01:100;
(2) a composite surfactant having a mass concentration of 0.1% (wherein a mass ratio of sodium alpha-olefin sulfonate (AOS) to lauramidopropyl betaine (LAB) was 1:1) was dissolved in water for a second contact, and the obtained mixed solution was added into the solution I to obtain a solution II; and
(3) the solution II was subjected to ultrasonic dispersion at a power of 500 W for 12 h at ° C. to obtain a superhydrophobic functional nanofluid, labeled as S4.

Application Comparative Example 1

A core flooding experiment was performed with unmodified hydrophilic nano SiO$_2$ as a flooding fluid, and a drag reduction ratio was calculated, labeled as D1.

Application Comparative Example 2

A core flooding experiment was performed with the hydrophobic nanoparticles (DMDCS@SiO$_2$) prepared in Comparative example 1 as a flooding fluid, and a drag reduction ratio was calculated, labeled as D2.

Application Comparative Example 3

A core flooding experiment was performed with the hydrophobic nanoparticles (D4@SiO$_2$) prepared in Comparative example 2 as a flooding fluid, and a drag reduction ratio was calculated, labeled as D3.

Test Example

The core drag reduction ratios of the nanofluids prepared in Examples 6-9 and Application comparative examples 1-3 were tested as technical indicators, and the results are shown in Table 2.

TABLE 2

| No. | SiO$_2$ modifying group | Nano-materials Wettability (Water contact angle) | Core slicing Before flooding | Core slicing After flooding | Drag reduction ratio 5 mD | Drag reduction ratio 1 mD |
|---|---|---|---|---|---|---|
| Example 6 | FAS | 165° | ~0° | 143° | 25.71% | 19.90% |
| Example 7 | FAS | 161° | ~0° | 140° | 24.65% | 19.45% |
| Example 8 | FAS | 153° | ~0° | 131° | 24.01% | 19.30% |
| Example 9 | FAS | 140° | ~0° | 127° | 23.56% | 17.62% |
| D1 | Un-modified | 23° | ~0° | ~0° | 20.27% | 14.90% |
| D2 | DMDCS | 136° | ~0° | 113° | 22.17% | 16.95% |
| D3 | D4 | 145° | ~0° | 117° | 22.83% | 17.27% |

As can be seen from Examples 6-9, Application comparative examples 1-3, and the results of Table 2, the superhydrophobic nanofluid prepared in the present disclosure exhibits good performance in terms of reducing the waterflooding pressure of the core, and reducing the friction rate of the core, the superhydrophobic nanoparticles have a contact angle of water drops in air that can be as high as 165°±2.4°, and the superhydrophobic nanofluid has a drag reduction ratio of up to for a low-permeability core of 5 mD, and has great application potential in "decompression and augmented injection" in waterflooding development of low-permeability oilfields.

In the examples of the present disclosure, there is also provided an application evaluation of the above superhydrophobic functional nanofluid in reducing the waterflooding pressure in an oilfield. According to the application evaluation of the superhydrophobic functional nanofluid in reducing the waterflooding pressure in the oilfield, a drag reduction ratio of the superhydrophobic functional nanofluid was mainly evaluated by means of a core pressure change through a core flow experiment; and the change of a flow field within a microchannel before and after adsorption of the superhydrophobic nanoparticles was completed by a microchannel visual flow field experiment.

In the examples of the present disclosure, according to the provided application evaluation of the superhydrophobic functional nanofluid in reducing the waterflooding pressure in the oilfield, the drag reduction ratio of the superhydrophobic functional nanofluid was mainly evaluated by means of the core pressure change through the core flow experiment; and the change of the flow field within the microchannel before and after adsorption of the superhydrophobic nanoparticles was completed by the microchannel visual flow field experiment. The experiments were as follows:

Experiments

The drag reduction ratio of the superhydrophobic functional nanofluid was evaluated by means of the core pressure change through the core flow experiment, and an experimental device is shown in FIG. 13, including: an ISCO pump 1, a nanofluid intermediate container 2, a six-way valve 3, a pressure gauge 4, a core holder 5, a confining pressure pump 6, and a collection measuring cylinder 7.

A specific method was as follows:
1) a water-saturated core was placed into the core holder 5, the six-way valve 3 was adjusted to connect an outlet of the ISCO pump 1 with an inlet of the core holder 5. After the oven temperature was stabilized at 60° C., the confining pressure was increased to 3 MPa, and the confining pressure was kept 2-3 MPa higher than the injection pressure. A constant flow mode of the ISCO pump 1 was then turned on to inject water into the core at a flow rate of 0.5 mL·min$^{-1}$. The injection pressure at the inlet of the core holder 5 was recorded by a pressure acquisition system, and the pressure after stabilization was recorded as P1;
2) after a 0.05 wt % SHNP nanofluid was added into the nanofluid intermediate container 2, the six-way valve 3 was adjusted to connect an outlet of the nanofluid intermediate container 2 filled with the nanofluid to the inlet of the core holder 5. The SHNP nanofluid was injected into the core at a flow rate of 0.2 mL·min$^{-1}$, which was stopped when the injection volume reached 0.5 PV. The inlet and an outlet of the core holder 5 were closed, and closing in was performed for 8 h (providing the wall adsorption time for nanoparticles);
3) finally, the SHNP nanofluid was re-injected into the core at a constant flow rate of 0.5 mL·min$^{-1}$ for subsequent water flooding, and the pressure at the inlet of the core holder 5 was recorded until the pressure was stabilized, recorded as P2.

The pressure gauge 4 communicates with the six-way valve 3, the core holder 5 communicates with the confining pressure pump 6 through a valve, and the outlet of the core holder communicates with the collection measuring cylinder 7.

4) a drag reduction ratio was calculated by the following formula (1):

$$R\% = \frac{P_1 - P_{2'}}{P_1} 100\% \quad (1)$$

According to the present disclosure, the change of the flow field within the microchannel before and after adsorption of the superhydrophobic nanoparticles was completed by the microchannel visual flow field experiment, and an experimental device is shown in FIG. 14, including: a display screen 8, a flow controller 9, a microparticle image velocimeter (μ-PIV) 10, a microchannel 11, and a microsyringe pump 12.

A specific method was as follows:
a) a model of the microchannel 11 was placed in a vacuum oven of 30° C. for drying;
b) deionized water (a control group), a hydrophilic nanofluid and the SHNP nanofluid were slowly injected into the model of the microchannel 11 at a rate of 0.01 mL·min$^{-1}$ for 8 h; and
c) 0.1 wt % of a monodisperse fluorescent solution (including a main component of polyethylene microspheres, with a particle size of 0.2 μm) was added dropwise to 50 mL of water to be ultrasonically dispersed at 40° C. for 10 min. The dispersed liquid was loaded into a Hamilton microsyringe pump 12, and then injected into the microchannel 11 at a constant flow rate of 0.05 mL min'. The flow field distribution within the microchannel before and after the injection of the nanofluid was obtained by the microparticle image velocimeter (μ-PIV) 10. A field of view of flow field observation was adjusted by the flow controller 9 to be 400 μm x400 μm, and finally all visual data was transmitted to the display screen 8.

The preferred embodiments of the present disclosure are described in detail above in combination with the drawings, but the present disclosure is not limited thereto. Various simple variations may be made to the technical solutions of the present disclosure within the scope of the technical concept of the present disclosure, including the combinations of various specific technical features in any suitable manner, and the various possible combinations of the present disclosure are not additionally described in order to avoid unnecessary repetitions. However, these simple variations and combinations should also be considered as the contents disclosed in the present disclosure and fall within the scope of protection of the present disclosure.

The invention claimed is:
1. A superhydrophobic nanoparticles including $SiO_2$ and a fluorine-containing long chain grafted on the surface of $SiO_2$, wherein the fluorine-containing long chain is a structural unit provided by heptadecafluorodecyltrimethoxysilane.

2. The superhydrophobic nanoparticles according to claim 1, wherein the superhydrophobic nanoparticles have a contact angle in air of 165°±2.4°.

3. A method for preparing a superhydrophobic nanoparticles comprising:
   Step 101, removing moisture adsorbed by nano $SiO_2$ under the vacuum condition to obtain a product I;
   Step 102, subjecting the product I, heptadecafluorodecyltrimethoxysilane, and acetic acid to oil bath heating in an acetone solution under the condition of nitrogen protection, and performing rotary evaporation concentration treatment to obtain a product II;
   Step 103, dissolving the product II in a xylene solution, and performing purification treatment, performing centrifugal separation on the purified product II, and performing vacuum drying and grinding treatment to obtain the superhydrophobic nanoparticles.

4. The method according to claim 3, wherein in the step Step 101, the nano $SiO_2$ has an original particle size in a range from 10 to 20 nm.

5. The method according to claim 3, wherein in the step Step 102, the acetone solution is 20-50 mL, a mass ratio of the usage amount of the product I to the usage amount of heptadecafluorodecyltrimethoxysilane is (140-80):(8-1), and a pH of the solution is adjusted to be in a range from 3 to 5 by acetic acid.

6. The method according to claim 3, wherein in the step Step 102, a mass ratio of the product I to heptadecafluorodecyltrimethoxysilane is (120-100):(4-2) relative to 20 mL of the acetone solution, and a pH is adjusted to be in a range from 3 to 4 by using an acetic acid solution.

7. The method according to claim 3, wherein in the step Step 102, the oil bath heating is performed at a temperature in a range from 45 to 70° C. for heating time in a range from 2 to 4 h; and the rotary evaporation concentration is performed at a temperature in a range from 50 to 80° C.;
   in the step Step 103, the centrifugal separation is performed at a rotational speed in a range from 5000 to 10000 rpm for centrifugation time in a range from 5 to 8 min; and the vacuum drying is performed at a temperature in a range from 100 to 120° C.

8. A superhydrophobic functional nanofluid including one or more of superhydrophobic nanoparticles, water, ethanol, sodium alpha-olefin sulfonate and lauramidopropyl betaine, and a mass ratio of the superhydrophobic nanoparticles to the water to ethanol to sodium alpha-olefin sulfonate to lauramidopropyl betaine is (0.01-0.15):100:(0.5-1):(1-2):(1-2); wherein the superhydrophobic nanoparticles are the superhydrophobic nanoparticles according to claim 1.

9. The superhydrophobic functional nanofluid according to claim 8, wherein a method for preparing the superhydrophobic functional nanofluid comprising:
   Step 201, mixing superhydrophobic nanoparticles with an ethanol solution, and adding water to obtain a solution I; wherein the superhydrophobic nanoparticles including $SiO_2$ and a fluorine-containing long chain grafted on the surface of $SiO_2$, wherein the fluorine-containing long chain is a structural unit provided by heptadecafluorodecyltrimethoxysilane;
   Step 202, dissolving sodium alpha-olefin sulfonate and lauramidopropyl betaine in water, performing mixing, and adding the obtained mixed solution into the solution I to obtain a solution II;
   Step 203, subjecting the solution II to ultrasonic dispersion treatment under the heating condition to obtain the superhydrophobic functional nanofluid.

10. The superhydrophobic functional nanofluid according to claim 9, wherein in the step Step 201, a mass ratio of the usage amount of the superhydrophobic nanoparticles to the usage amount of the water to the usage amount of ethanol is (0.01-0.15):100:(0.5-1).

11. The superhydrophobic functional nanofluid according to claim 9, wherein in the step Step 202, a mass ratio of the usage amount of sodium alpha-olefin sulfonate to the usage amount of lauramidopropyl betaine is (1-2):(1-2), sodium alpha-olefin sulfonate and lauramidopropyl betaine form a composite surfactant, and the mass concentration of the composite surfactant in the resulting aqueous solution is in a range from 0.1 to 0.5%.

12. The superhydrophobic functional nanofluid according to claim 9, wherein in the step Step 203, the ultrasonic dispersion is performed at a power in range from 500 to 800 W for ultrasonic time in a range from 12 to 24 h; and the temperature of the heating condition is in a range from 50 to 80° C.

13. The superhydrophobic functional nanofluid according to claim 9, wherein the superhydrophobic nanofluid is applied to decompression and augmented injection in water-flooding development of low-permeability oilfields.

\* \* \* \* \*